United States Patent
Kumada et al.

(10) Patent No.: US 9,401,519 B2
(45) Date of Patent: Jul. 26, 2016

(54) CONTROL DEVICE FOR FUEL CELL SYSTEM

(71) Applicant: NISSAN MOTOR CO., LTD., Yokohama-shi, Kanagawa (JP)

(72) Inventors: Mitsunori Kumada, Yokosuka (JP); Yoshitomo Asai, Atsugi (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 79 days.

(21) Appl. No.: 14/348,957

(22) PCT Filed: Sep. 19, 2012

(86) PCT No.: PCT/JP2012/073929
§ 371 (c)(1),
(2) Date: Apr. 1, 2014

(87) PCT Pub. No.: WO2013/051394
PCT Pub. Date: Apr. 11, 2013

(65) Prior Publication Data
US 2014/0248551 A1    Sep. 4, 2014

(30) Foreign Application Priority Data

Oct. 3, 2011 (JP) ................................. 2011-219298

(51) Int. Cl.
*H01M 8/04* (2016.01)
*B60L 1/00* (2006.01)
(Continued)

(52) U.S. Cl.
CPC ........... *H01M 8/04201* (2013.01); *B60L 1/003* (2013.01); *B60L 3/0038* (2013.01); *B60L 11/1805* (2013.01); *B60L 11/1861* (2013.01); *B60L 11/1885* (2013.01);
(Continued)

(58) Field of Classification Search
None
See application file for complete search history.

(56) References Cited

U.S. PATENT DOCUMENTS

| 5,925,476 A | 7/1999 | Kawatsu |
| 2002/0039672 A1* | 4/2002 | Aramaki ........................ 429/22 |

(Continued)

FOREIGN PATENT DOCUMENTS

| JP | 10-083824 | 3/1998 |
| JP | 2004-235075 | 8/2004 |

(Continued)

OTHER PUBLICATIONS

Japanese Office Action, Mar. 3, 2015, 4 pages.

*Primary Examiner* — Patrick Ryan
*Assistant Examiner* — Jose Colucci Rios
(74) *Attorney, Agent, or Firm* — Foley & Lardner LLP

(57) ABSTRACT

A fuel cell system includes, an oxidant feeder configured to supply an oxidant to a fuel cell, an oxidant passage which communicates with the fuel cell, a bypass passage which branches from the oxidant passage and along which part of the oxidant flows so as to bypass the fuel cell, a bypass valve which is provided in the bypass passage, an oxidant quantity-of-flow control unit which is configured to supply the quantity of flow of the oxidant corresponding to an amount of electricity required by the fuel cell, and an oxidant quantity-of-flow control unit for a sound vibration mode configured to supply a constant quantity of flow of the oxidant, and further includes a bypass valve control unit configured to control the bypass valve according to a requirement of the fuel cell when the oxidant quantity-of-flow control unit for the sound vibration mode controls the oxidant feeder.

11 Claims, 24 Drawing Sheets

(51) Int. Cl.
*B60L 11/18* (2006.01)
*B60L 15/20* (2006.01)
*B60L 3/00* (2006.01)

(52) U.S. Cl.
CPC ........ *B60L 11/1887* (2013.01); *B60L 11/1892* (2013.01); *B60L 11/1898* (2013.01); *B60L 15/20* (2013.01); *H01M 8/04089* (2013.01); *H01M 8/04753* (2013.01); *B60L 2210/10* (2013.01); *B60L 2240/36* (2013.01); *B60L 2240/421* (2013.01); *B60L 2240/423* (2013.01); *B60L 2240/549* (2013.01); *B60L 2250/26* (2013.01); *B60L 2270/142* (2013.01); *B60L 2270/145* (2013.01); *H01M 8/04104* (2013.01); *H01M 2250/20* (2013.01); *Y02E 60/50* (2013.01); *Y02T 10/645* (2013.01); *Y02T 10/705* (2013.01); *Y02T 10/7044* (2013.01); *Y02T 10/7216* (2013.01); *Y02T 10/7275* (2013.01); *Y02T 90/16* (2013.01); *Y02T 90/32* (2013.01); *Y02T 90/34* (2013.01)

(56) References Cited

U.S. PATENT DOCUMENTS

| 2008/0261092 A1* | 10/2008 | Bono ............................ 429/25 |
| 2010/0003576 A1* | 1/2010 | Tamura ......................... 429/34 |
| 2010/0068575 A1 | 3/2010 | Manabe et al. |
| 2010/0151337 A1* | 6/2010 | Kanazawa .................. 429/413 |
| 2011/0293972 A1 | 12/2011 | Naganuma et al. |

FOREIGN PATENT DOCUMENTS

| JP | 2006-164626 A | 6/2006 |
| JP | 2006-179331 A | 7/2006 |
| JP | 3895263 B2 | 3/2007 |
| JP | 2007-194080 | 8/2007 |
| JP | 2008-226592 A | 9/2008 |
| JP | 2009-266426 A | 11/2009 |
| WO | WO-2011/148426 | 12/2011 |

* cited by examiner

CONTROL DEVICE FOR FUEL CELL SYSTEM

TECHNICAL FIELD

The present invention relates to a device that controls a fuel cell system.

BACKGROUND ART

Although in a fuel cell system, it is necessary to supply air according to the amount of electricity generated by the fuel cell, an electric generation requirement is likely to vary by SOC control on a battery or the like, and periodic variation sound from a compressor supplying air to a fuel cell stack is likely to be generated. Such variation sound, in particular, is likely to be recognized by a passenger, for example, when a vehicle is at rest with background noise low. The passenger feels such variation sound harsh to have an uncomfortable feeling.

On the other hand, in JP2006-179331A, the variation sound is masked by irregular noise such as in a radiator fan, and thus it is unlikely to be recognized by a passenger.

Other related literatures includes JP3895263B.

SUMMARY OF INVENTION

However, it is possible to perform the method described above only when the radiator fan is driven. On the other hand, although one way to solve this problem is to make the quantity of flow of the compressor constant, this causes unnecessary air to be supplied to the electric generation of the fuel cell stack, with the result that there is a concern that, for example, over-drying is disadvantageously produced.

Hence, the present invention is made by focusing on such a problem. An object of the present invention is to provide a control device for a fuel cell system in which the operating sound of a compressor is unlikely to be recognized by a passenger.

A control device for a fuel cell system according to one aspect of the present invention supplies power to an external load with a storage cell and a fuel cell. The fuel cell system includes, an oxidant feeder configured to supply an oxidant to the fuel cell; an oxidant passage which communicates with the fuel cell and along which the oxidant supplied from the oxidant feeder flows, a bypass passage which branches from the oxidant passage upstream with respect to the fuel cell and along which part of the oxidant supplied by the oxidant feeder flows so as to bypass the fuel cell, a bypass valve which is provided in the bypass passage and which is configured to adjusts a quantity of flow of the oxidant flowing along the bypass passage; an oxidant quantity-of-flow control unit configured to supply, with the oxidant feeder, the quantity of flow of the oxidant corresponding to an amount of electricity required by the fuel cell, and an oxidant quantity-of-flow control unit for a sound vibration mode configured to supply, with the oxidant feeder, a constant quantity of flow of the oxidant. The control device further includes a bypass valve control unit configured to control the bypass valve according to a requirement of the fuel cell when the oxidant quantity-of-flow control unit for the sound vibration mode configured to control the oxidant feeder.

Embodiments of the present invention and advantages of the present invention will be described in detail below with reference to accompanying drawings.

DESCRIPTION OF EMBODIMENTS

First Embodiment

Figure 1:
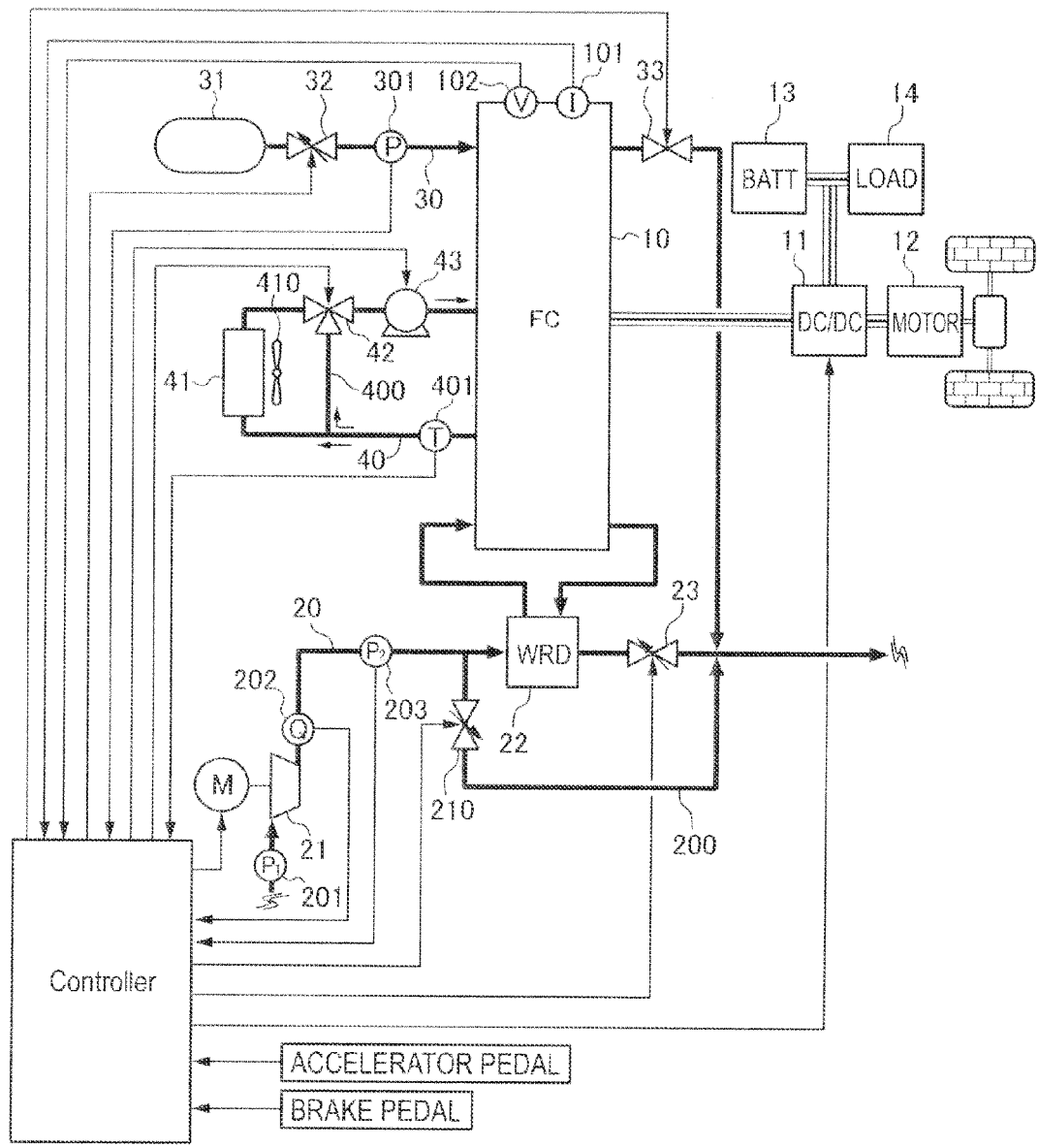
FIG. 1 is a diagram showing a basic system to which a control device for a fuel cell system according to the present invention is applied.

FIG. 1 is a diagram showing a basic system to which a control device for a fuel cell system according to the present invention is applied.

With reference to FIG. 1, a description will first be given of the basic system to which the control device for the fuel cell system according to the present invention is applied.

In a fuel cell stack 10, while an electrolyte membrane is being kept in an appropriate humid state, reactive gases (oxygen $O_2$ and hydrogen $H_2$) are supplied to generate electricity. To achieve this, a cathode line 20, an anode line 30 and a cooling water circulation line 40 are connected to the fuel cell stack 10. A current generated by the fuel cell stack 10 is detected by a current sensor 101. A voltage generated by the fuel cell stack 10 is detected by a voltage sensor 102.

Air containing the oxygen $O_2$ supplied to the fuel cell stack 10 flows as a cathode gas along the cathode line 20. In the cathode line 20, a compressor 21, a WRD (water recovery device) 22 and a cathode pressure adjustment valve 23 are provided. A bleed line 200 is also provided in parallel to the cathode line 20. The bleed line 200 is branched from the cathode line 20 that is downstream with respect to the compressor 21 but is upstream with respect to the WRD 22, and is combined with the cathode line 20 that is downstream with respect to the cathode pressure adjustment valve 23. With this configuration, part of the air blown by the compressor 21 flows into the bleed line 200, and bypasses the fuel cell stack 10. In the bleed line 200, a bleed valve 210 is provided. The bleed line 200 corresponds to a bypass passage in the scope of claims. The bleed valve 210 corresponds to a bypass valve in the scope of claims.

In the present embodiment, the compressor 21 is, for example, a centrifugal turbo compressor. The compressor 21 is arranged in the cathode line 20 that is upstream with respect to the fuel cell stack 10 and the WRD 22. The compressor 21 is driven by a motor M. The compressor 21 adjusts the quantity of flow of the cathode gas flowing along the cathode line 20. The quantity of flow of the cathode gas is adjusted by the rotation speed of the compressor 21.

The WRD 22 humidifies the air introduced into the fuel cell stack 10. The WRD 22 includes a humidified portion through which a gas that is a humidification target flows and a humidifying portion through which a water-containing gas that is a humidifying source flows. The air introduced by the compressor 21 flows through the humidified portion. The water-containing gas flows through the humidifying portion via the fuel cell stack 10.

The cathode pressure adjustment valve 23 is provided in the cathode line 20 that is downstream with respect to the fuel cell stack 10. The cathode pressure adjustment valve 23 adjusts the pressure of the cathode gas flowing along the cathode line 20. The pressure of the cathode gas is adjusted by the degree of opening of the cathode pressure adjustment valve 23.

A pressure P1 of the cathode gas flowing along the cathode line 20 that is upstream with respect to the compressor 21 is detected by a cathode pressure sensor 201. The cathode pressure sensor 201 is provided upstream with respect to the compressor 21.

The quantity of flow Q of the cathode gas flowing along the cathode line 20 is detected by a cathode quantity-of-flow sensor 202. The cathode quantity-of-flow sensor 202 is provided downstream with respect to the compressor 21 but upstream with reference to the WRD 22.

The pressure of the cathode gas flowing along the cathode line 20 is detected by a cathode pressure sensor 203. The cathode pressure sensor 203 is provided downstream with respect to the compressor 21 but upstream with respect to the WRD 22. Furthermore, in FIG. 1, the cathode pressure sensor 203 is located downstream with respect to the cathode quantity-of-flow sensor 202.

The bleed valve 210 is provided in the bleed line 200. The bleed valve 210 adjusts the quantity of flow of the cathode gas flowing along the bleed line 200. The quantity of flow of the cathode gas is adjusted by the degree of opening of the bleed valve 210.

The hydrogen $H_2$ supplied to the fuel cell stack 10 flows as an anode gas along the anode line 30. In the anode line 30, a cylinder 31, an anode pressure adjustment valve 32 and a purge valve 33.

In the cylinder 31, the hydrogen $H_2$ is stored so as to be in a high pressure state. The cylinder 31 is provided most upstream of the anode line 30.

The anode pressure adjustment valve 32 is provided downstream with respect to the cylinder 31. The anode pressure adjustment valve 32 adjusts the pressure of the anode gas newly supplied from the cylinder 31 to the anode line 30. The pressure of the anode gas is adjusted by the degree of opening of the anode pressure adjustment valve 32.

A purge valve 34 is provided downstream with respect to the fuel cell stack 10. When the purge valve 34 is opened, the anode gas is purged.

The pressure of the anode gas flowing along the anode line 30 is detected by an anode pressure sensor 301. The anode pressure sensor 301 is provided downstream with respect to the adjustment valve 32 but upstream with respect to the fuel cell stack 10.

Cooling water supplied to the fuel cell stack 10 flows along the cooling water circulation line 40. In the cooling water circulation line 40, a radiator 41, a three-way valve 42 and a water pump 43 are provided. A bypass line 400 is provided in parallel to the cooling water circulation line 40. The bypass line 400 is branched from the cooling water circulation line 40 that is upstream with respect to the radiator 41, and is combined with the cooling water circulation line 40 that is downstream with respect to the radiator 41. Hence, the cooling water flowing along the bypass line 400 bypasses the radiator 41.

The radiator 41 cools the cooling water. In the radiator 41, a cooling fan 410 is provided.

The three-way valve 42 is located in a combination portion between the bypass line 400 and the cooling water circulation line 40. The three-way valve 42 adjusts, according to the degree of opening, the quantity of flow of the cooling water flowing along the line on the radiator side and the quantity of flow of the cooling water flowing along the bypass line. Thus, the temperature of the cooling water is adjusted.

The water pump 43 is located downstream with respect to the three-way valve 42. The water pump 43 feeds the cooling water flowing through the three-way valve 42 to the fuel cell stack 10.

The temperature of the cooling water flowing along the cooling water circulation line 40 is detected by a water temperature sensor 401. The water temperature sensor 401 is provided upstream with respect to the portion where the bypass line 400 is branched.

A controller inputs the signals of the current sensor 101, the voltage sensor 102, the cathode pressure sensor 201, the cathode quantity-of-flow sensor 202, the cathode pressure sensor 203, the anode pressure sensor 301 and the water temperature sensor 401. Then, the controller outputs the signals to control the operations of the compressor 21, the cathode pressure adjustment valve 23, the bleed valve 210, the anode pressure adjustment valve 32, the purge valve 34, the three-way valve 42 and the water pump 43.

With this configuration, the fuel cell stack 10 is kept at an appropriate temperature, and while the electrolyte membrane is being kept in an appropriate humid state, the reactive gases (the oxygen $O_2$ and the hydrogen $H_2$) for generating electricity are supplied sufficiently, with the result that it is possible to perform stable electric generation. Power generated by the fuel cell stack 10 is supplied through a DC/DC converter 11 to a travel motor 12, a battery 13 and a load 14.

Figure 2:
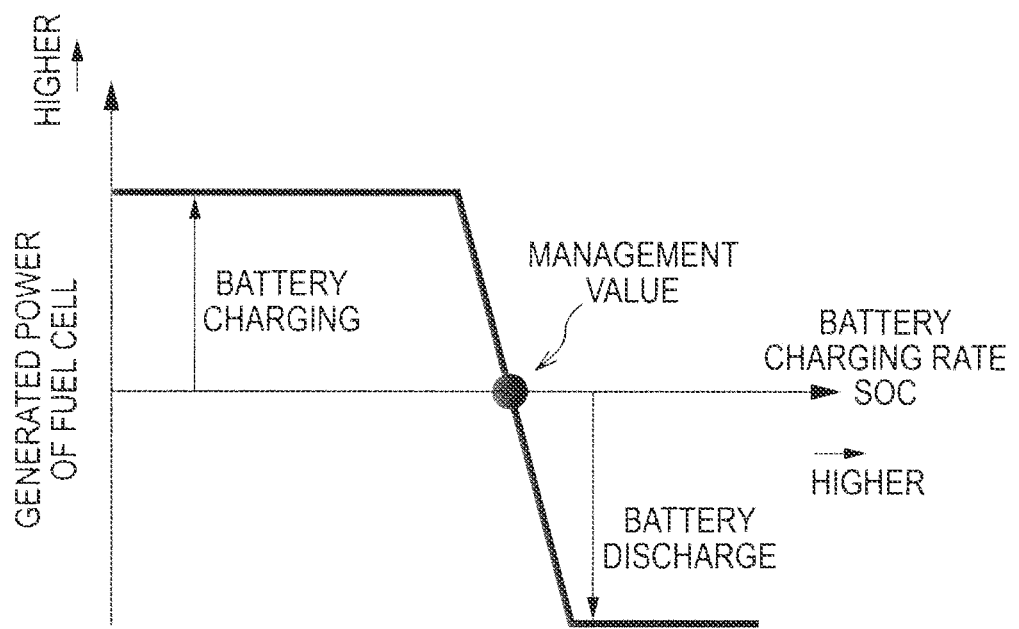
FIG. 2 is a correlation diagram between a charging rate SOC of a battery and the generated power of a fuel cell stack.

FIG. 2 is a correlation diagram between the charging rate SOC of the battery and the generated power of the fuel cell stack.

The inventors are in the process of developing a system that uses the generated power of the fuel cell stack 10 and/or the power of the battery 13 to drive the travel motor 12 and the load 14. In order not to reduce the life of the battery 13, it is preferable to manage the battery charging rate SOC to a predetermined value. However, since power is consumed significantly in a transient operating state, the battery charging rate SOC is more likely to be varied. Even in a steady operating state, the battery charging rate SOC is more likely to be varied by a variation in the generated power of the fuel cell stack or a variation in an auxiliary load. Although in the first place, the battery charging rate SOC is calculated by totaling current sensor values, resetting is performed as necessary to remove an error. In this way, an error is removed, and at the same time the battery charging rate SOC is likely to be varied. It is important to reduce the variation in the battery charging rate SOC described above and to manage the battery charging rate SOC to the predetermined value.

Hence, as shown in FIG. 2, when the battery charging rate SOC is higher than a management value, the generated power of the fuel cell stack 10 is reduced. In this way, the battery 13 is discharged. Consequently, the battery charging rate SOC approaches the management value. When the battery charging rate SOC is lower than the management value, the generated power of the fuel cell stack 10 is increased. In this way, the battery 13 is charged. Consequently, the battery charging rate SOC approaches the management value.

Figure 3:
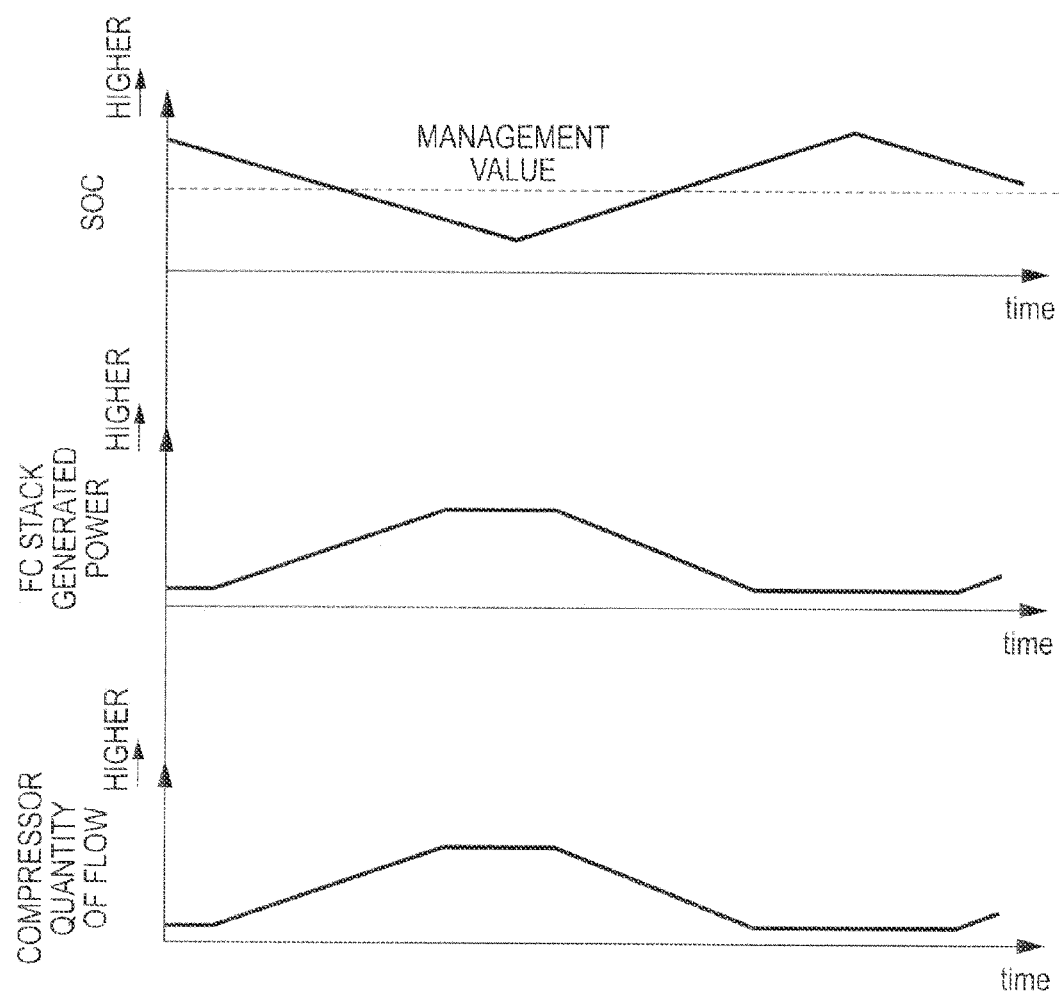
FIG. 3 is a diagram illustrating a problem to be solved in an embodiment.

FIG. 3 is a diagram illustrating a problem to be solved in the present embodiment.

As described above, depending on whether the battery charging rate SOC is higher or lower than the predetermined value (management value), the generated power of the fuel cell stack 10 is adjusted, and thus the battery charging rate SOC is managed to the predetermined value (management value).

However, when the generated power of the fuel cell stack 10 is adjusted, conventionally, as shown in FIG. 3, the quantity of flow supplied from the compressor is controlled to vary the quantity of flow of the air flowing along the cathode line 20. Here, the rotation speed of the compressor 21 is varied.

For example, when a vehicle is at rest, the sound of the compressor 21 is varied, and thus a passenger feels such sound harsh to have an uncomfortable feeling.

Hence, in the present embodiment, without the rotation speed of the compressor 21 being varied, the generated power of the fuel cell stack 10 is adjusted.

A specific manner will be described below.

Figure 4:
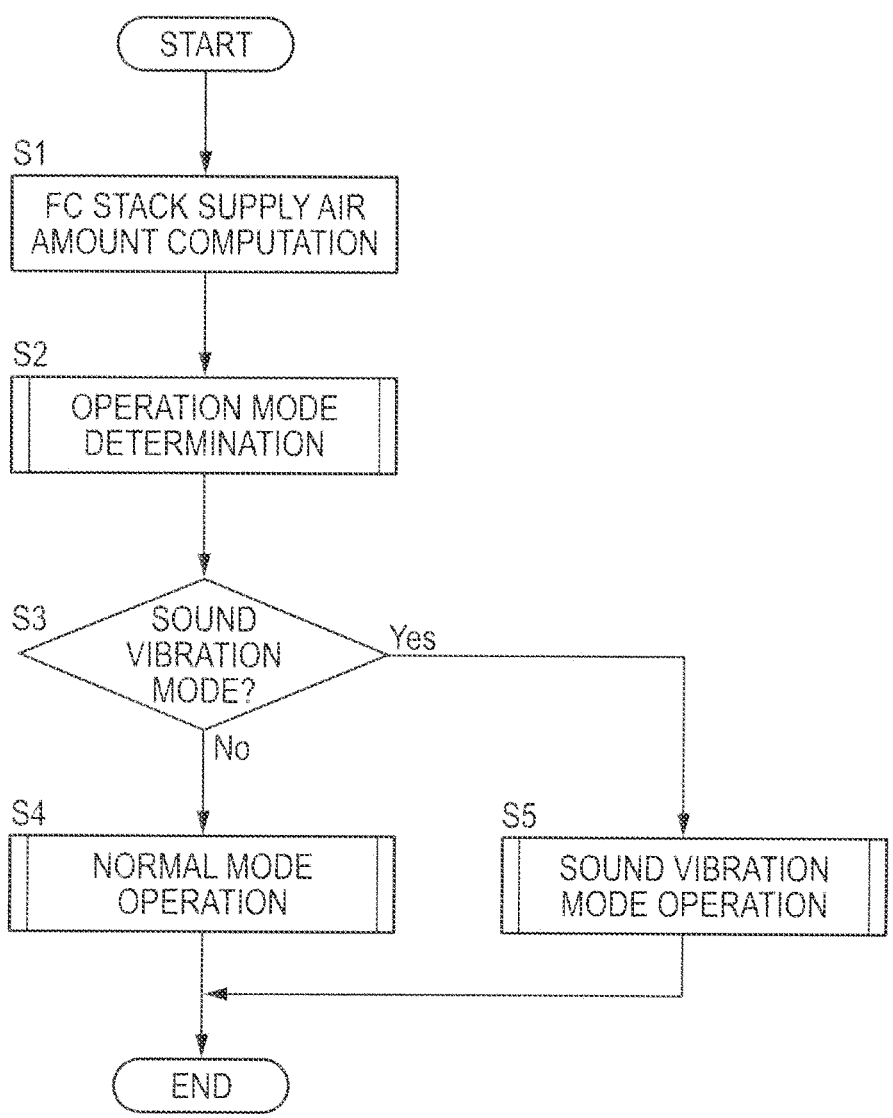
FIG. 4 is a control flowchart that is performed by the controller of the control device for the fuel cell system according to the present invention.

FIG. 4 is a control flowchart that is performed by a controller of the control device for the fuel cell system according to the present invention. The controller repeatedly performs this flowchart every minute time (for example, 10 milliseconds).

In step S1, the controller computes the amount of air supplied to the fuel cell stack 10. Specific details will be described later.

In step S2, the controller determines an operation mode. Specific details will be described later.

In step S3, the controller determines whether or not the operation mode is a sound vibration mode. If the operation mode is not the sound vibration mode, the controller transfers the processing to step S4 whereas if the operation mode is the sound vibration mode, the controller transfers the processing to step S5.

In step S4, the controller performs a normal mode. Specific details will be described later.

In step S5, the controller performs the sound vibration mode. Specific details will be described later.

Figure 5:
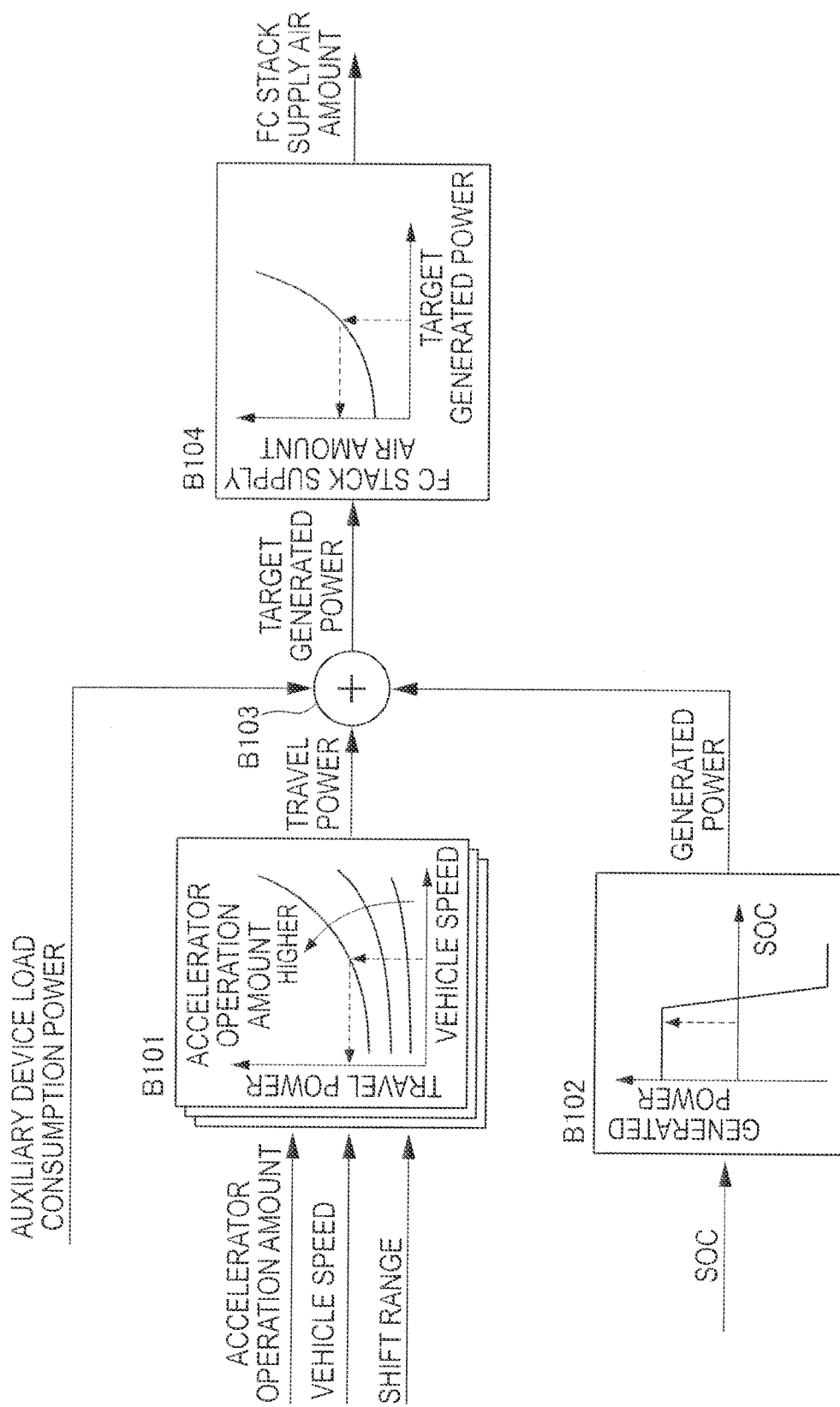
FIG. 5 is a block diagram showing a function of computing the amount of air supplied to the fuel cell stack.

FIG. 5 is a block diagram showing the function of computing the amount of air supplied to the fuel cell stack.

The following individual blocks shown in the block diagram indicate the individual functions of the controller as imaginary units, and the blocks do not mean physical entities.

The block B101 computes travel power based on a shift range, an accelerator pedal operation amount and a vehicle speed. Specifically, among a plurality of maps prepared previously, a map corresponding to the present shift range is selected. Then, the accelerator pedal operation amount and the vehicle speed are applied to the map, and the travel power (=power necessary for the motor to satisfy the requirement of a driver) for which the motor produces a torque necessary for travel is computed.

The block B102 computes the generated power for managing the battery charging rate SOC to the management value.

The block B103 adds the consumption power of the auxiliary load, the travel power computed by the block B101 and the generated power computed by the block B102 to determine target generated power to be generated by the fuel cell. In the generated power of the battery, when the battery is charged, a positive value is set whereas when the battery is discharged, a negative value is set. When the battery needs charging, in order to perform the charging by the generated power of the fuel cell, it is necessary for the fuel cell to increase the generated power with consideration given to the charging for the battery. On the other hand, when the battery needs discharging, in order for the battery to compensate for part of the power to the motor, it is necessary to reduce the generated power of the fuel cell.

The block B104 computes the amount of air supplied to the fuel cell stack 10 based on the target generated power computed by the block B103.

As described above, the processing of step S1 in the flowchart has been performed.

Figure 6:
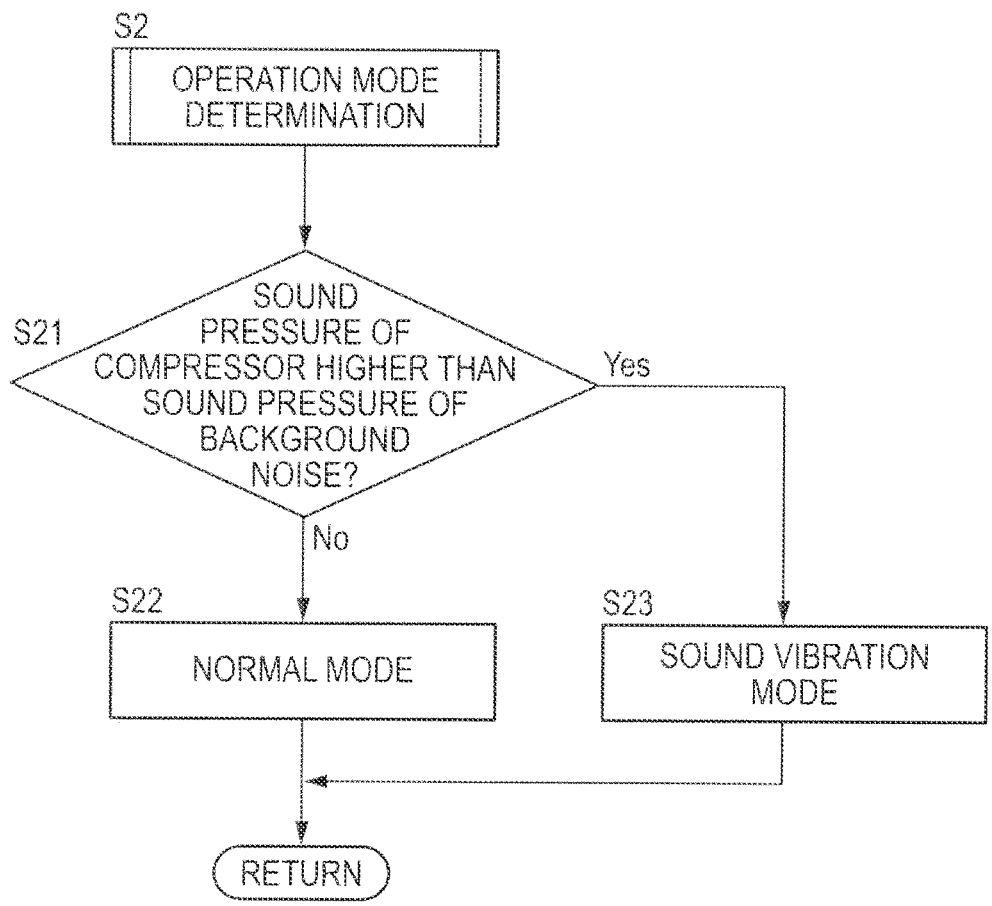
FIG. 6 is a diagram showing a subroutine that determines an operation mode.

FIG. 6 is a diagram showing a subroutine that determines the operation mode.

In step S21, the controller determines whether or not the sound pressure level of the compressor 21 is higher than that of background noise. The sound pressure level is preferably detected by attaching, for example, a microphone. Preferably, the determination in the present step is performed, for example, when the vehicle is at rest or when the fuel cell is in an idle state (the state where the power to the motor is 0, and only the power supply to the auxiliary device and the battery is performed). If the determination result is negative, the controller transfers the processing to step S22 whereas if the determination result is positive, the controller transfers the processing to step S23.

In step S22, the controller determines the normal mode.

In step S23, the controller determines the sound vibration mode.

Figure 7:
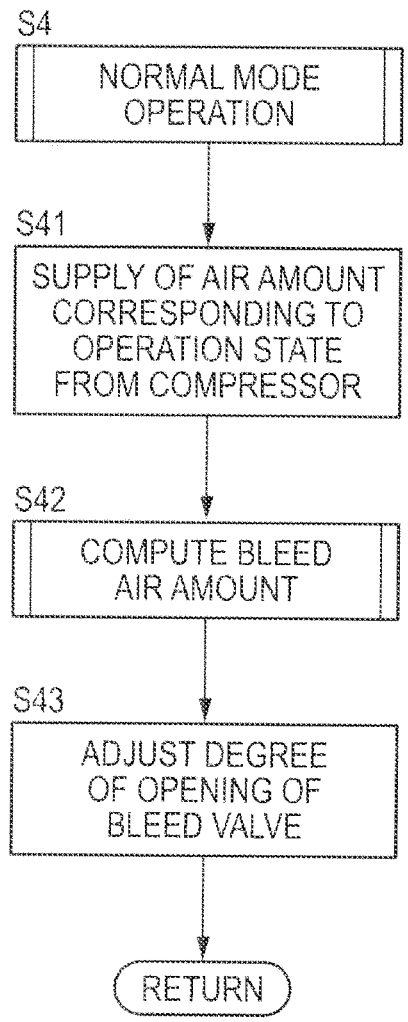
FIG. 7 is a diagram showing a subroutine in a normal mode operation.

FIG. 7 is a diagram showing a subroutine in a normal mode operation.

In step S41, the controller computes the amount of air corresponding to the generated power required for the fuel cell. On the other hand, the amount of air is compared with the minimum quantity of flow that the compressor 21 achieves. As this quantity of flow, there is a quantity of flow for avoiding the surge of the compressor 21 (for example, when the quantity of flow in the compressor is low, if the pressure of the stack is high, a surge is produced, and hence, the minimum quantity of flow for preventing a surge is set). Then, the quantity of flow of air corresponding to the generated power is compared with the minimum quantity of flow that the compressor needs to achieve, and if the quantity of flow of air corresponding to the generated power is higher, the compressor 21 supplies the quantity of flow of air corresponding to the generated power. On the other hand, if the minimum quantity of flow that the compressor 21 needs to achieve is higher, the compressor 21 supplies this quantity of flow.

In step S42, the controller computes the amount of air flowing along the bleed line 200. When the compressor 21 supplies the quantity of flow corresponding to the generated power of the fuel cell, the quantity of flow that is bled is 0. However, when the compressor 21 supplies the minimum quantity of flow that the compressor 21 needs to achieve, the quantity of flow higher than that needed by the fuel cell is supplied to the fuel cell. Since an unnecessary quantity of flow is supplied to the fuel cell stack, for example, the humid state of the fuel cell is disadvantageously dried. Since the electric generation is determined by the load of an external load, the unnecessary air does not affect the power balance. Hence, in order to prevent the unnecessary air from being supplied to the fuel cell, the bleed valve is opened such that only the amount of air necessary for the electric generation is supplied to the fuel cell stack. In the present step, the quantity of flow to the bleed valve is computed. Specific details will be described later.

In step S43, the controller adjusts the degree of opening of the bleed valve 210 such that the amount of air computed in step S42 flows along the bleed line 200.

Figure 8:
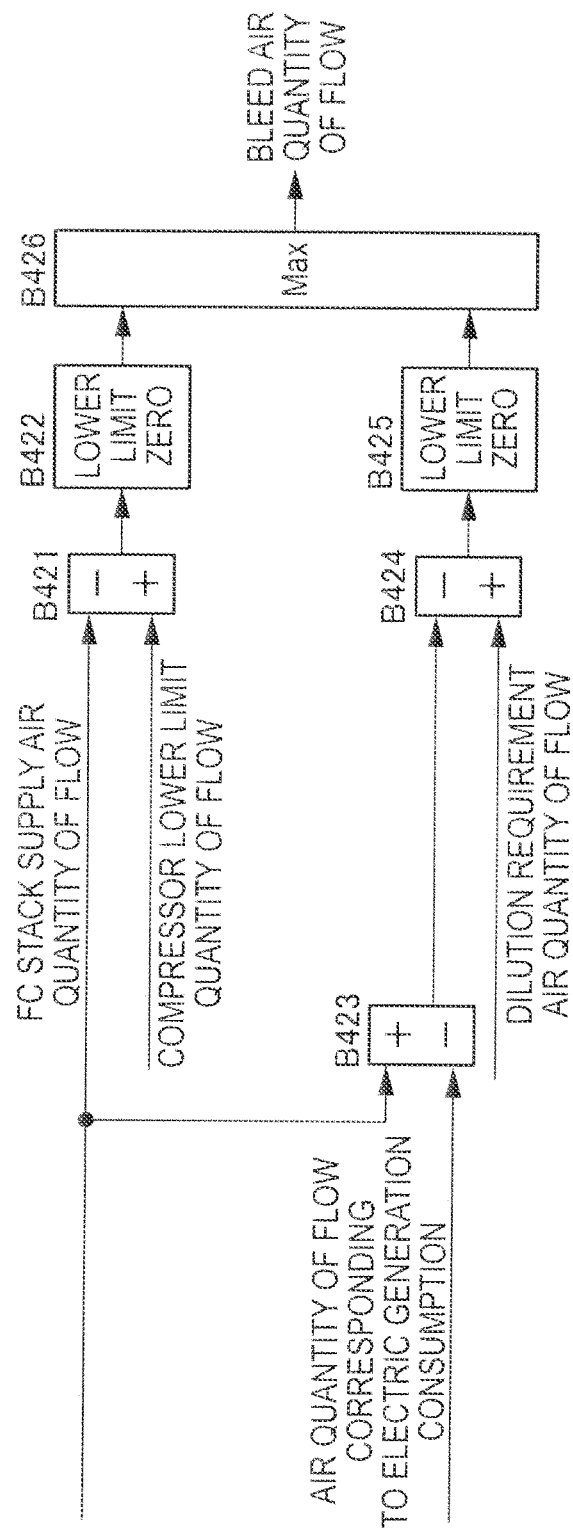
FIG. 8 is a block diagram showing a function of computing the amount of air bled in the normal mode operation.

FIG. 8 is a block diagram showing the function of computing the amount of air bled in the normal mode operation.

The block B421 subtracts the amount of air supplied to the fuel cell stack 10 from the lower limit quantity of flow in the compressor 21. When the quantity of flow supplied is excessively low, the compressor 21 may be subjected to a surge. The lower limit quantity of flow in the compressor 21 refers to the minimum quantity of flow for preventing such a problem. When the amount of air supplied to the fuel cell stack 10 is higher than the lower limit quantity of flow in the compressor 21, the block B421 outputs a negative value. When the amount of air supplied to the fuel cell stack 10 is lower than the lower limit quantity of flow in the compressor 21, the block B421 outputs a positive value.

When the output result of the block B421 is a positive value, the block B422 outputs such a positive value as it is whereas when the output result is a negative value, the block B422 outputs zero. The case of a negative value is that under conditions in which the compressor 21 supplies the air necessary for the electric generation of the fuel cell stack, the bleed valve 210 is preferably all closed. Specifically, it is necessary to compute a value at which the bleed valve does not pass the air, and since such a value is 0, in the case of a negative value, the value is set at zero. On the other hand, the case of a positive value is the conditions under which the compressor 21 passes a higher quantity of flow than the quantity of flow that the fuel cell stack needs. Here, the bleed valve 210 passes the quantity of flow that is the positive value, as it is, to the bleed line 200, and thus only the quantity of flow necessary for the electric generation is supplied to the fuel cell stack.

A description will now be given again of the blocks B423, B424 and B425.

In the above discussion, the computation of the quantity of flow bled in a case where the minimum quantity of flow for avoiding the surge of the compressor 21 itself is set as the quantity of flow in the compressor 21 has been described. Here, a description will be given of the computation of the quantity of flow bled in a case where the quantity of flow for the dilution of the purge gas of the fuel cell is set in the compressor 21.

A description will first be given of the dilution.

Nitrogen on the cathode side is permeated, through an ion exchange membrane, which is an electric generation area, to the anode side of the fuel cell stack. Since in order to stably generate electricity on the anode side, it is necessary to maintain highly concentrated hydrogen, the nitrogen is purged together with hydrogen gas either periodically or by detecting the concentration of the nitrogen. In this way, it is necessary to keep the concentration of the hydrogen within the anode high.

On the other hand, when the purge is performed, the hydrogen is discharged out of the fuel cell stack together with the nitrogen, and in the present embodiment, in order for the concentration of the hydrogen to be reduced to a predetermined concentration or less, the off-gas of the hydrogen is mixed with the off-gas of the oxygen to perform the dilution.

In general, when the generated power is high, since the quantity of flow of air necessary for the electric generation of the fuel cell stack is supplied, and thus the quantity of flow necessary for the dilution is supplied, the compressor 21 supplies the amount of air corresponding to the generated power.

However, when the generated power is lower, with respect to the hydrogen to be purged from the fuel cell stack, the desired concentration of the hydrogen or less may not be achieved only by the quantity of flow necessary for the electric generation. Hence, the quantity of flow necessary for the dilution is supplied by the compressor 21.

When the quantity of flow necessary for the dilution is passed, with respect to the quantity of flow necessary for the electric generation of the fuel cell stack, the bleed valve 210 is used to pass the unnecessary quantity of flow to the bleed line 200, and this point is the same as what has been described above.

The block B423 first subtracts the quantity of flow consumed by the electric generation from the amount of air supplied to the fuel cell stack 10. Thus, the amount of air that is discharged without being consumed in the fuel cell stack 10 is output.

The block B424 subtracts the amount of air that is discharged without being consumed in the fuel cell stack 10 from a dilution requirement air amount. When the purge valve 34 is opened, the anode gas $H_2$ is discharged. The amount of air necessary to dilute the anode gas $H_2$ is the dilution requirement air amount. When the amount of air that is discharged without being consumed by the electric generation in the fuel cell stack 10 is higher than the dilution requirement air amount, the block B424 outputs a negative value. When the amount of air that is discharged without being consumed by the electric generation in the fuel cell stack 10 is lower than the dilution requirement air amount, the block B424 outputs a positive value.

When the output result of the block B424 is the positive value, the block B425 outputs it as it is whereas the output result of the block B424 is the negative value, the block B425 outputs zero.

The block B426 compares the output of the block B422 and the output of the block B425, and outputs the higher one as a bleed air amount.

In the present embodiment, the supply amount by the compressor 21 is varied according to the electric generation of the fuel cell. In particular, while the fuel cell is performing an idle operation, when the generated power required by the fuel cell is varied by SOC control, the rotation speed of the compressor 21 is varied according to such variation, with the result that there is a concern that under conditions in which background noise is low, an uncomfortable feeling is given to the driver. Even when the compressor 21 itself passes the minimum quantity of flow or the quantity of flow for the dilution, if the quantity of flow of air based on the electric generation requirement of the fuel cell is increased by the requirement of the SOC, there is a concern that the rotation speed of the compressor 21 is likewise varied.

Hence, a description will be given below of a control logic for preventing the rotation speed of the compressor 21 from being varied according to the requirement of the SOC when background noise is low.

Figure 9:
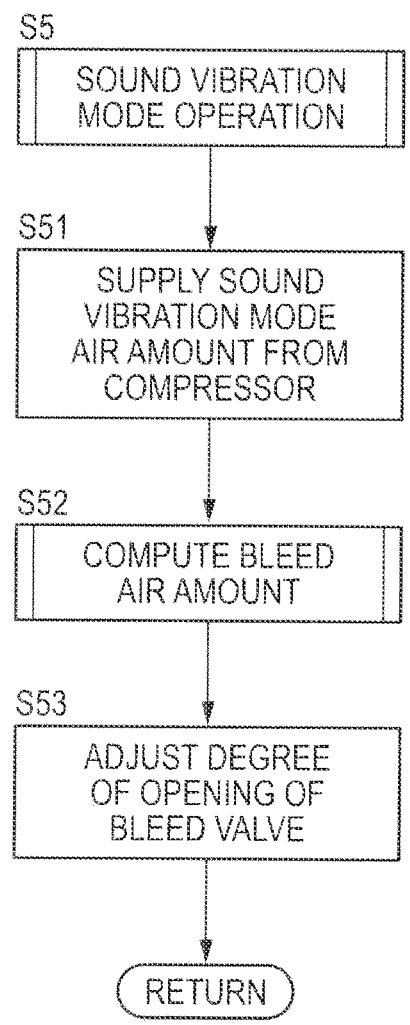
FIG. 9 is a diagram showing a subroutine of a sound vibration mode operation.

FIG. 9 is a diagram showing a subroutine of a sound vibration mode operation.

In step S51, the controller supplies a sound vibration mode air amount (constant value) from the compressor 21. This value is preferably a value that is, in the sound vibration mode, higher than the maximum amount of air set based on the electric generation requirement. This is because such a value is set and thus it is possible to prevent the rotation speed of the compressor 21 from being varied completely based on the SOC requirement.

Even in the sound vibration mode, since the compressor 21 supplies the quantity of flow higher than the quantity of flow based on the electric generation requirement of the fuel cell stack, the amount of air unnecessary for the electric generation of the fuel cell stack is passed to the bleed line 200 by the bleed valve 210.

In step S52, the controller first computes the amount of air passed to the bleed line 200. Specific details will be described later.

In step S53, the controller adjusts the degree of opening of the bleed valve 210 such that the amount of air computed in step S52 is passed to the bleed line 200.

Figure 10:
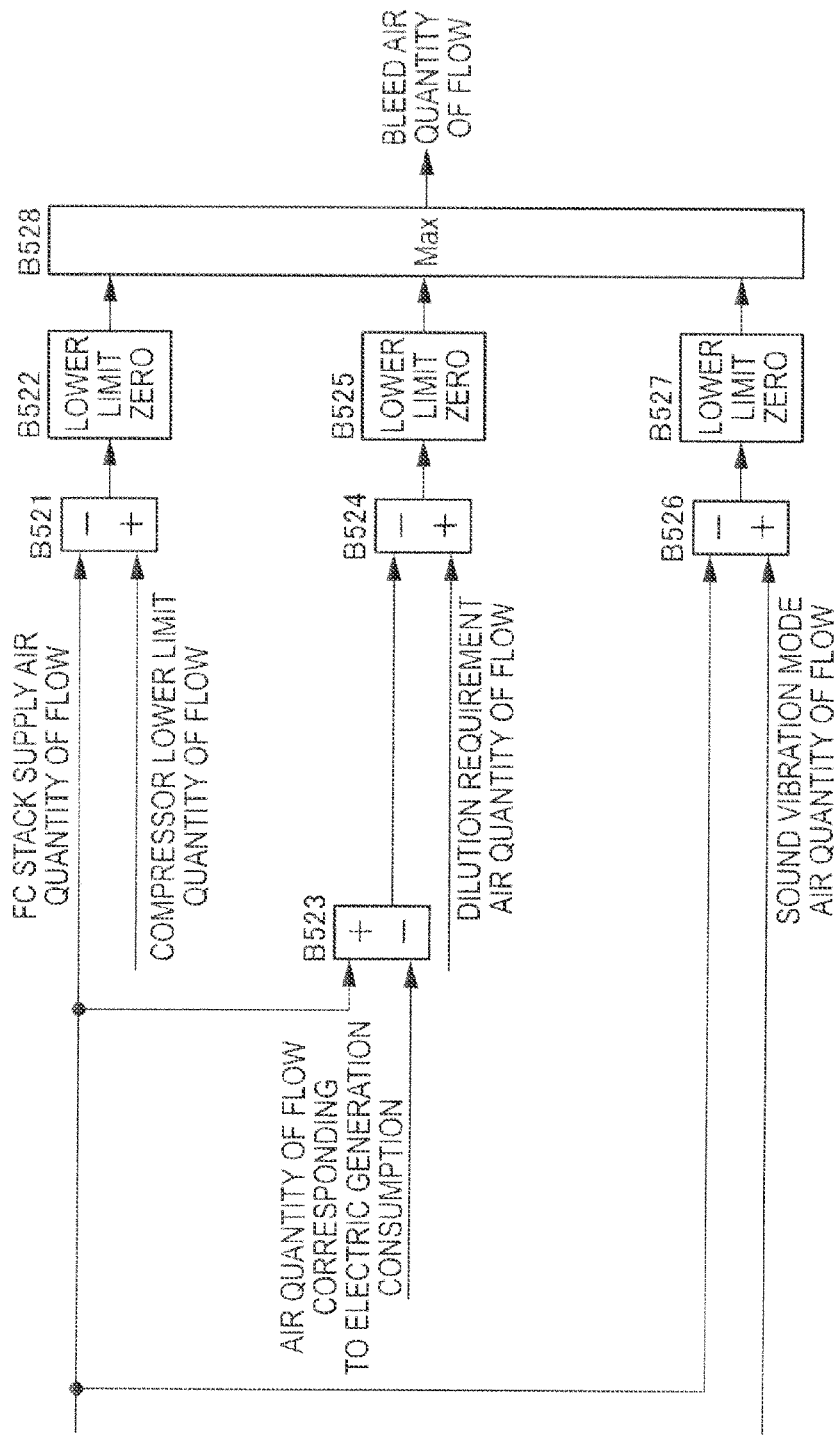
FIG. 10 is a block diagram showing the function of computing the amount of air bled in the sound vibration mode operation.

FIG. 10 is a block diagram showing the function of computing the amount of air bled in the sound vibration mode operation.

A block B521 subtracts the amount of air supplied to the fuel cell stack 10 from the lower limit quantity of flow in the compressor 21. The block B521 is basically the same as the block B421.

When the output result of the block B521 is a positive value, the block B522 outputs such a positive value as it is whereas when the output result is a negative value, the block B522 outputs zero. The block B522 is basically the same as the block B422.

A block B523 subtracts the quantity of flow consumed by the electric generation from the amount of air supplied to the fuel cell stack 10. The block B523 is basically the same as the block B423.

A block B524 subtracts the amount of air that is discharged without being consumed by the electric generation in the fuel cell stack 10 from the dilution requirement air amount. The block B524 is basically the same as the block B424.

When the output result of the block B524 is a positive value, the block B525 outputs such a positive value as it is whereas when the output result is a negative value, the block B525 outputs zero. The block B525 is basically the same as the block B425.

A block B526 subtracts the amount of air corresponding to the generated power required by the fuel cell stack 10 from the sound vibration mode air amount. Under conditions in which the compressor 21 supplies the amount of air in the sound vibration mode, it is desired to supply only the air necessary for the electric generation to the fuel cell stack. The amount of air supplied to the bleed line 200 to achieve this is computed as described above. In the sound vibration mode operation, since the sound vibration mode air amount is higher than the amount of air supplied to the fuel cell stack 10, the block B526 outputs a positive value.

Since the output result of the block B526 is a positive value, a block B527 generally outputs the positive value as it is. However, since it is assumed that a certain abnormality occurs in computation by a computer and thus the quantity of flow based on the electric generation requirement may become higher than the sound vibration mode air amount, the block B526 deals with this case. If a negative value is output from the block B526, the block B527 deals with this case by outputting zero.

A block B528 compares the output of the block B522, the output of the block B525 and the output of the block B527, and outputs the highest one as the amount of air bled.

Figure 11:
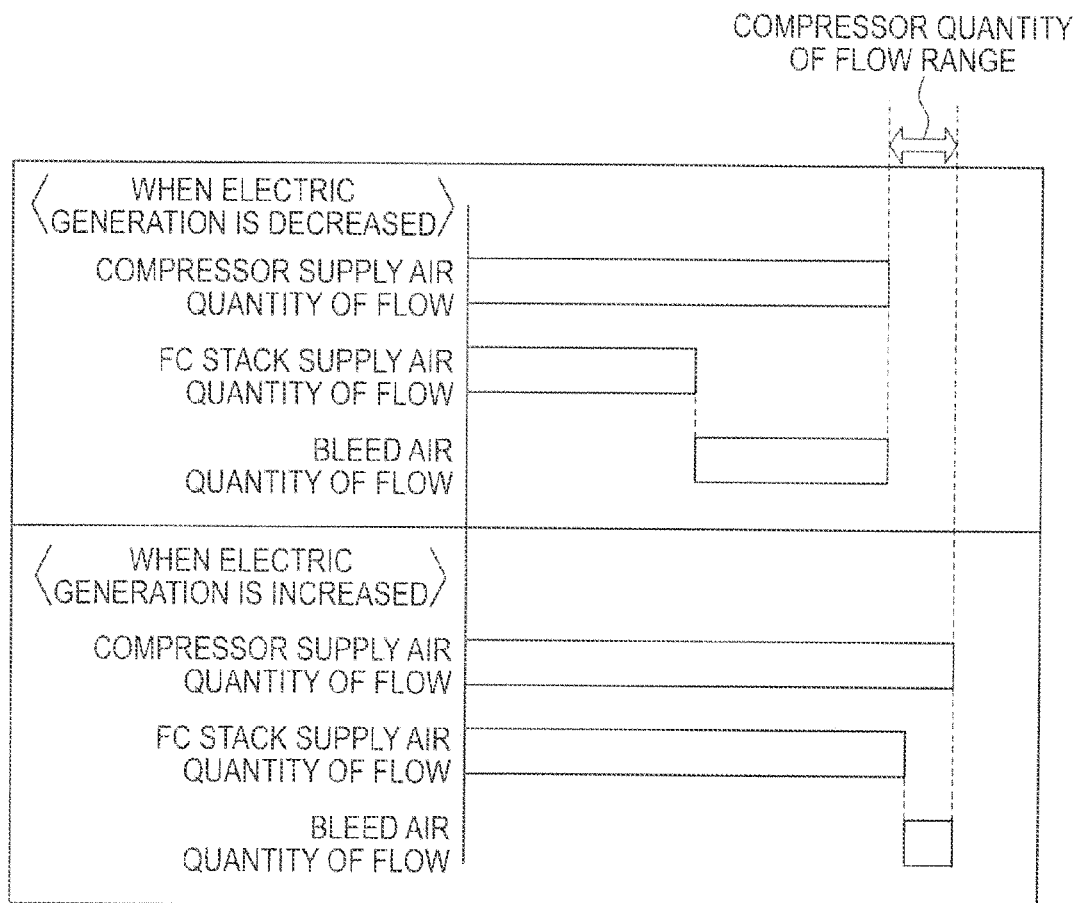
FIG. 11 is a diagram illustrating an operation in the normal mode operation in a first embodiment.

FIG. 11 is a diagram illustrating an operation in the normal mode operation in a first embodiment.

In the normal mode operation, the amount of air corresponding to the electric generation requirement to the fuel cell is supplied from the compressor. However, if the quantity of flow supplied is excessively low, a surge is likely to occur. Hence, even when the quantity of flow supplied is low such as when the electric generation is low in FIG. 11, the air corresponding to the lower limit quantity of flow in the compressor 21 is supplied, and an extra amount of air exceeding the quantity of flow (FC stack supply air amount) necessary for generating the target generated power of the fuel cell stack is passed to the bleed line.

When the electric generation is increased, the amount of air higher than when the electric generation is low is supplied from the compressor.

As described above, in the normal mode operation, the quantity of flow in the compressor 21 is varied according to the state of the operation.

Figure 12:
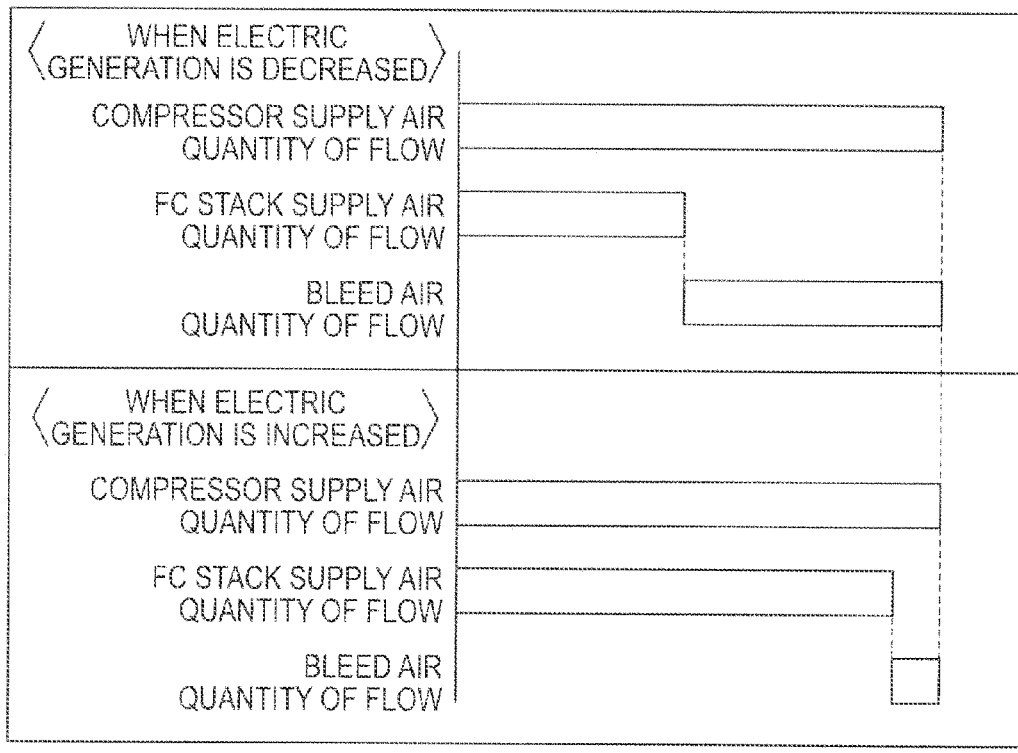
FIG. 12 is a diagram illustrating an operation in the sound vibration mode operation in the first embodiment.

FIG. 12 is a diagram illustrating an operation in the sound vibration mode operation in the first embodiment.

In the sound vibration mode operation, the sound vibration mode air amount is supplied from the compressor 21. This sound vibration mode air amount is a constant value regardless of when the electric generation is decreased or when the electric generation is increased.

The extra amount of air exceeding the quantity of flow (FC stack supply air amount) necessary for generating the target generated power of the fuel cell stack is passed to the bleed line. In other words, the amount of air supplied to the fuel cell stack is adjusted according to the amount of air bled.

Figure 13:
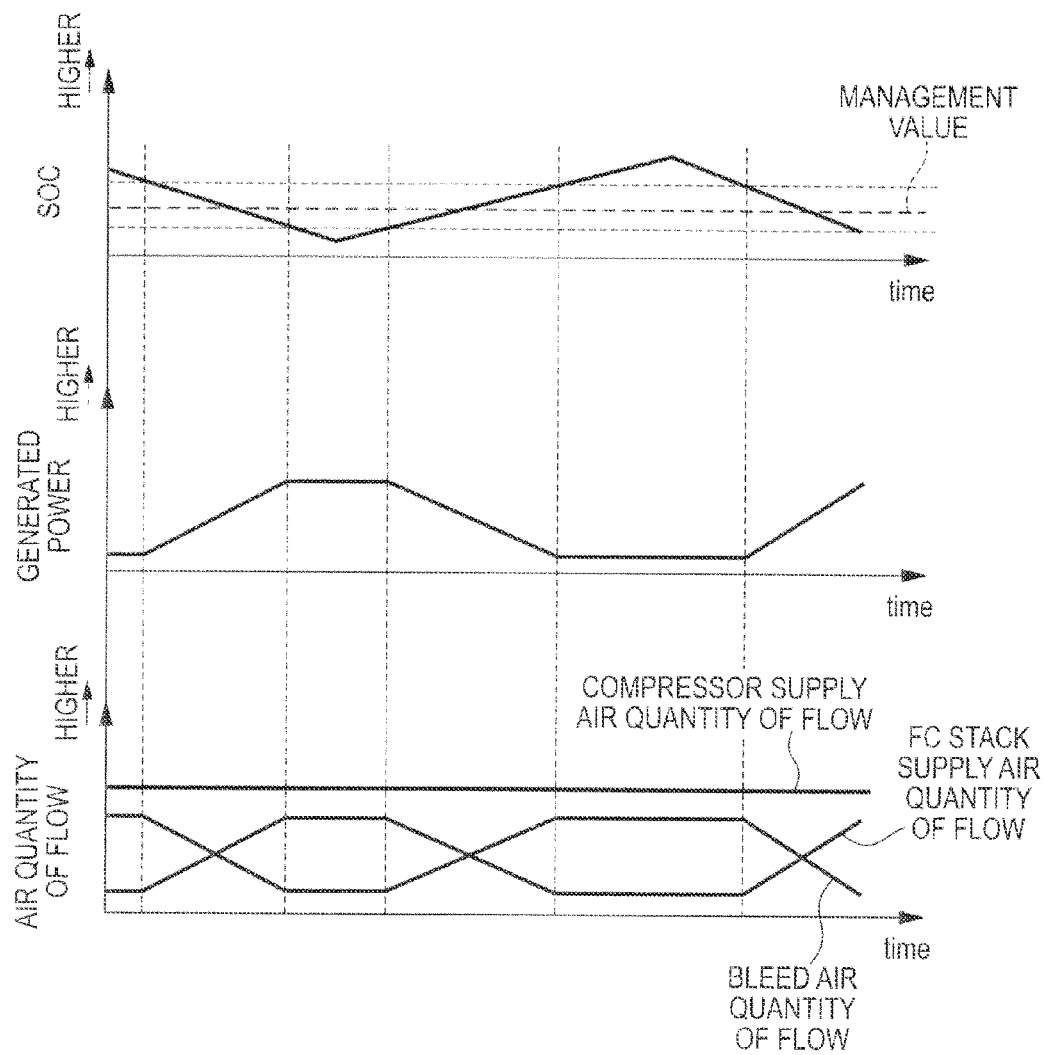
FIG. 13 is a time chart illustrating the operation in the sound vibration mode operation in the first embodiment.

FIG. 13 is a time chart illustrating the operation in the sound vibration mode operation in the first embodiment.

As described above, the fuel cell system adjusts the generated power of the fuel cell stack 10 according to whether the battery charging rate SOC is higher or lower than the predetermined value (management value), and thereby manages the battery charging rate SOC to the predetermined value (management value).

In the present embodiment, a constant sound vibration mode air amount is supplied from the compressor 21. In other words, the rotation speed of the compressor 21 is kept constant. Then, by adjusting the amount of air bled, the amount of air supplied to the fuel cell stack is adjusted.

When the generated power of the fuel cell stack 10 is adjusted, the rotation speed of the compressor 21 is varied, and thus the passenger feels harsh sound to have an uncomfortable feeling.

By contrast, in the present embodiment, since the rotation speed of the compressor 21 is kept constant, the operating sound of the compressor 21 is not varied, and thus the passenger does not have an uncomfortable feeling.

In the present embodiment, only when the sound pressure level of the compressor 21 is higher than that of background noise, the sound vibration mode operation is performed to keep the rotation speed of the compressor 21 at a high constant speed.

When the sound pressure level of the compressor 21 is lower than that of background noise, even if the sound of the compressor 21 is varied, it is not recognized. However, when the sound pressure level of the compressor 21 is higher than that of background noise, the variation in the sound of the compressor 21 is recognized.

The rotation speed of the compressor 21 is kept at a high constant speed, and power is wastefully consumed accordingly.

Hence, in the present embodiment, the operation scene in the sound vibration mode is limited, and thus it is possible to avoid waste power consumption as much as possible.

Second Embodiment

Figure 14:
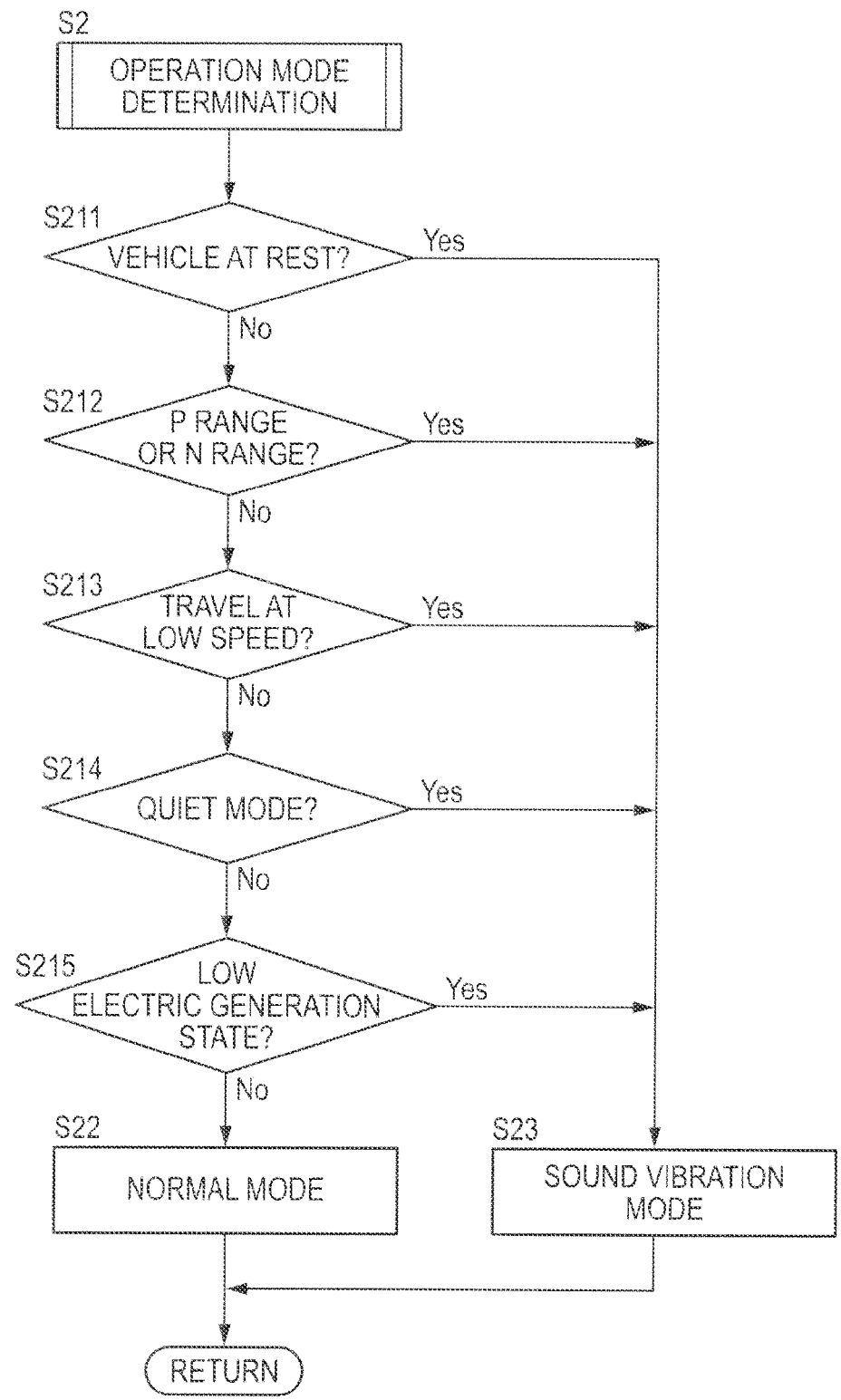
FIG. 14 is a diagram showing an operation mode determination subroutine in a second embodiment of the fuel cell system according to the present invention.

FIG. 14 is a diagram showing an operation mode determination subroutine in a second embodiment of the fuel cell system according to the present invention.

In the following description, parts having the same functions as described above are identified with the same symbols, and their description will be omitted as necessary.

In the first embodiment, for example, whether or not the sound pressure level of the compressor 21 is higher than that of background noise is determined directly by a sound pressure level detected by the microphone. However, in such a method, the microphone is needed, and thus the cost is increased. In the present embodiment, whether or not the sound pressure level of the compressor 21 is higher than that of background noise is estimated (determined indirectly) based on the state of the operation. Specific details will be described later.

In step S211, the controller determines whether or not the vehicle is at rest. If the determination result is negative, the controller transfers the processing to step S212 whereas if the determination result is positive, the controller transfers the processing to step S23.

In step S212, the controller determines whether or not the shift range is a parking range ("P range") or a neutral range ("N range"). If the determination result is negative, the controller transfers the processing to step S213 whereas if the determination result is positive, the controller transfers the processing to step S23.

In step S213, the controller determines whether or not the vehicle is travelling at a low speed. The low-speed travel refers to travel at a speed lower than a speed when the sound pressure level of background noise is lower than that of the compressor 21. A threshold value for determining whether or not the vehicle is travelling at a low speed is set by previously performing an experiment or the like. If the determination result is negative, the controller transfers the processing to step S214 whereas if the determination result is positive, the controller transfers the processing to step S23.

In step S214, the controller determines whether or not the mode is a quiet mode. The quiet mode is set by the operation of a switch by the driver and the like. If the determination result is negative, the controller transfers the processing to step S215 whereas if the determination result is positive, the controller transfers the processing to step S23.

In step S215, the controller determines whether or not the fuel cell stack 10 is in a low electric generation state. The low electric generation state refers to a state where the amount of electricity is lower than an amount of electricity when the sound pressure level of background noise is lower than that of the compressor 21. A threshold value for determining whether or not the fuel cell stack 10 is in the low electric generation state is set by previously performing an experiment or the like. If the determination result is negative, the controller transfers the processing to step S22 whereas if the determination result is positive, the controller transfers the processing to step S23.

In step S22, the controller determines the normal mode.

In step S23, the controller determines the sound vibration mode.

In the present embodiment, in the operation scene where the sound pressure level of background noise is lower than that of the compressor 21, it is estimated that the sound pressure level of background noise is lower than that of the compressor 21. In this way, without use of a microphone, it is possible to estimate (indirectly determine) whether or not the sound pressure level of the compressor 21 is higher than that of background noise. Thus, it is possible to reduce the cost to be inexpensive.

Third Embodiment

Figure 15:
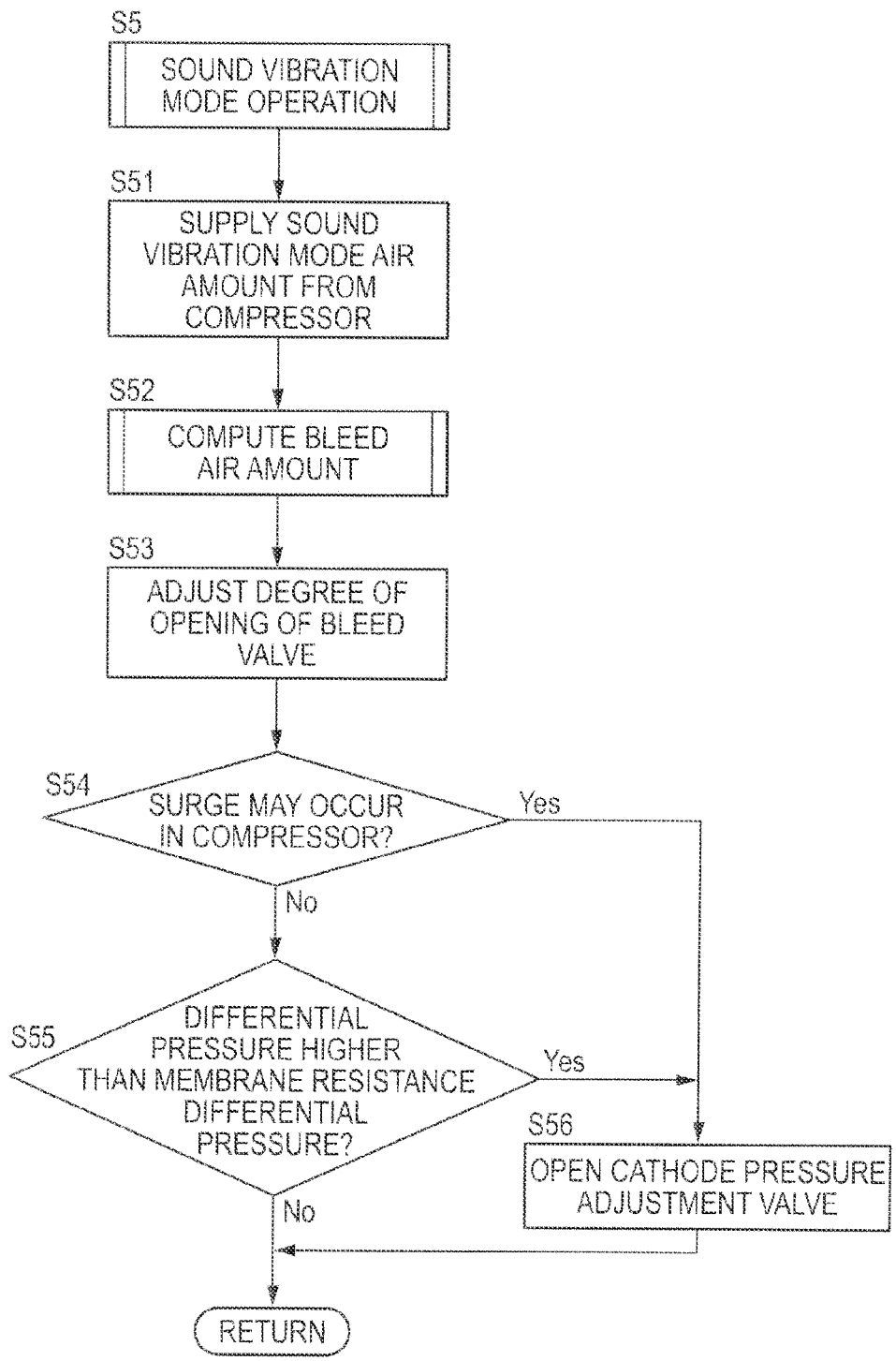
FIG. 15 is a diagram showing a sound vibration mode operation subroutine in a third embodiment of the fuel cell system according to the present invention.

FIG. 15 is a diagram showing a sound vibration mode operation subroutine in a third embodiment of the fuel cell system according to the present invention.

Since steps S51 to S53 are the same as in the first embodiment, their description will be omitted.

In step S54, the controller determines whether or not a surge occurs in the compressor 21. This is determined based on the amount of air supplied by the compressor 21 and a pressure ratio in the compressor 21 (a ratio (P2/P1) of an exit pressure P2 to an entrance pressure P1 of the compressor 21). If the determination result is negative, the controller transfers the processing to step S55 whereas if the determination result is positive, the controller transfers the processing to step S56.

In step S55, the controller determines whether or not a differential pressure between the front and back surfaces of the electrolyte membrane of the fuel cell does not exceed a membrane resistance differential pressure. The pressure on the cathode side is computed by subtracting a loss caused by the passing of the cathode gas through the WRD 22 or the like from the detection value of the cathode pressure sensor 203. The pressure on the anode side is detected by the anode pressure sensor 301. As the case where the differential pressure between the front and back surfaces of the electrolyte membrane of the fuel cell exceeds the membrane resistance differential pressure, a case where the pressure on the cathode side is high and a case where the pressure on the anode side is high can be generally considered. However, in the present embodiment, since the mode is the sound vibration mode (the mode in which as compared with the normal mode, the amount of air supplied from the compressor 21 is increased), the case where the pressure on the cathode side is high applies. If the determination result is negative, the controller temporarily stops the processing whereas if the determination result is positive, the controller transfers the processing to step S56.

In step S56, the controller increases the degree of opening of the cathode pressure adjustment valve 23.

Figure 16:
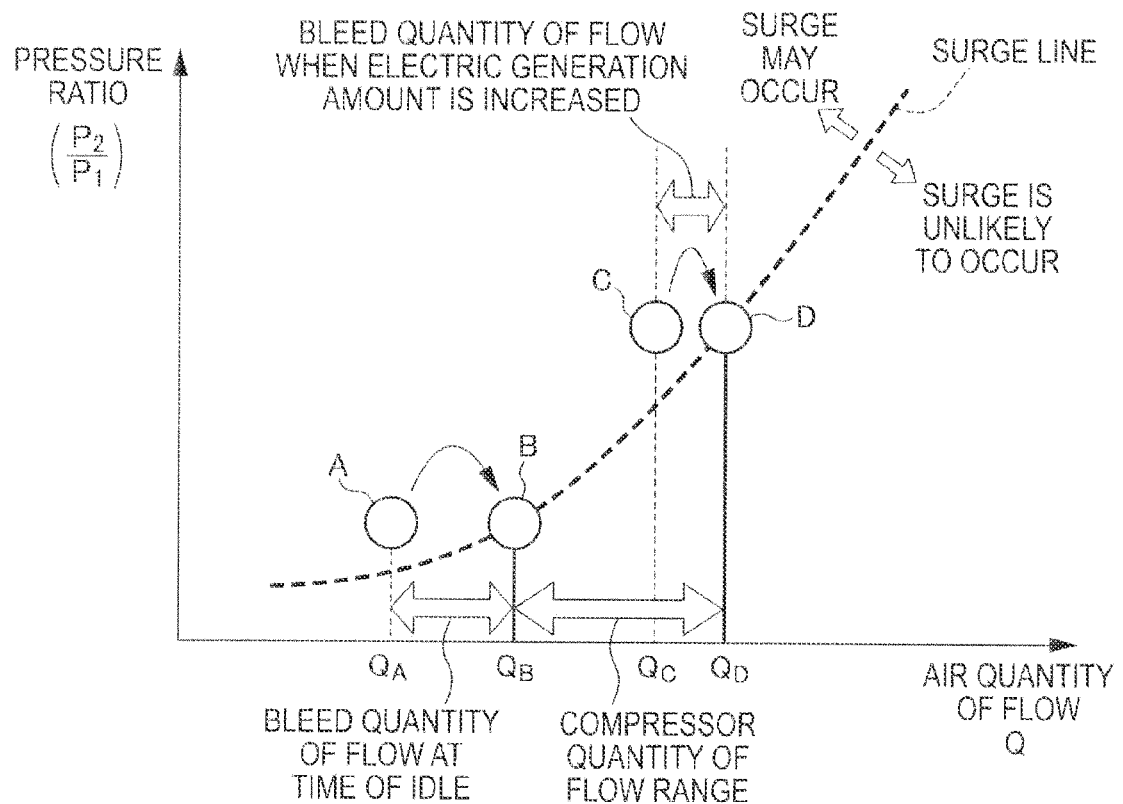
FIG. 16 is a diagram illustrating an operation method of the compressor in the normal mode operation.

FIG. 16 is a diagram illustrating an operation method of the compressor 21 in the normal mode operation. In FIG. 16, the horizontal axis is the quantity of flow of air, and the vertical axis is the pressure ratio (the ratio (P2/P1) of the exit pressure P2 to the entrance pressure P1 of the compressor 21).

In the present embodiment, although when the sound pressure level of background noise is low such as in the idle operation, the sound vibration mode operation is performed, even if the idle operation is performed, a case where the normal mode operation is performed will be considered.

In the idle operation, an operation point of the compressor 21 required from the generated power of the fuel cell stack 10 is A. In other words, the quantity of flow in the compressor 21 is preferably $Q_A$. However, since the operation point A is in a surge region above a surge line, a surge may occur in the compressor 21. Hence, the quantity of flow is set at $Q_B$, and the compressor 21 is operated at operation point B. However, in this state, an extra amount of air is inevitably supplied to the fuel cell stack 10. Hence, ($Q_B$-$Q_A$) is bled.

When the electric generation is increased, an operation point of the compressor 21 required from the generated power of the fuel cell stack 10 is C. In other words, the quantity of flow in the compressor 21 is preferably $Q_C$. However, since the operation point C is in the surge region above the surge line, a surge may occur in the compressor 21. Hence, the quantity of flow is set at $Q_D$, and the compressor 21 is operated at operation point D. However, in this state, an extra amount of air is inevitably supplied to the fuel cell stack 10. Hence, ($Q_D$-$Q_C$) is bled.

As described above, in the normal mode, the quantity of flow in the compressor 21 is adjusted from $Q_B$ to $Q_D$, and the quantity of flow exceeding the quantity of flow necessary for the electric generation is bled.

Figure 17:
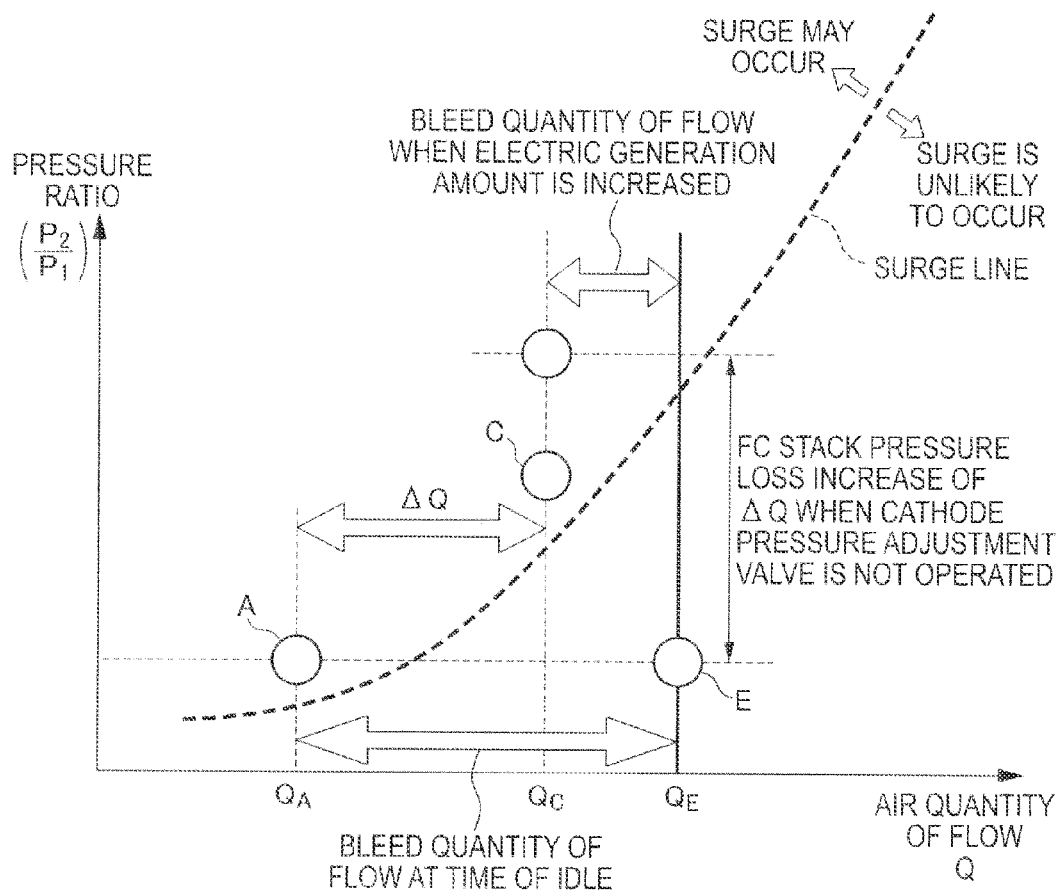
FIG. 17 is a diagram illustrating a problem when in the sound vibration mode operation, a cathode pressure adjustment valve is not controlled.

FIG. 17 is a diagram illustrating a problem when in the sound vibration mode operation, the cathode pressure adjustment valve is not controlled.

Then, a case where the sound pressure level of background noise is low and the sound vibration mode operation is performed will be considered.

Although in the present embodiment, when a surge is likely to occur in the compressor 21 (yes in step S54), the quantity of flow in the compressor 21 is increased (step S56), and the degree of opening of the cathode pressure adjustment valve 23 is increased (step S57), a case where the degree of opening of the cathode pressure adjustment valve 23 is not adjusted will be temporarily considered.

In the sound vibration mode, a sound vibration mode air amount $Q_E$ is supplied from the compressor 21. However, in the idle operation, the quantity of flow required from the generated power of the fuel cell stack 10 may be $Q_A$. Hence, in the idle operation, the sound vibration mode air amount $Q_E$ is supplied from the compressor 21, and ($Q_E$-$Q_A$) is bled.

Then, a case where the amount of electricity is increased and the quantity of flow $Q_C$ is supplied to the fuel cell stack 10 will be considered, and $Q_C$=$Q_A$+$\Delta Q$. Here, the amount of air supplied from the compressor 21 remains the sound vibration mode air amount $Q_E$, and ($Q_E$-$Q_C$) is bled.

Here, if the degree of opening of the cathode pressure adjustment valve 23 is not adjusted, the amount of air supplied to the fuel cell stack 10 is increased by $\Delta Q$, and the exit pressure P2 of the compressor 21 is increased accordingly, with the result that there is a possibility that it is impossible to avoid a surge. As the exit pressure P2 of the compressor 21 is increased, the pressure on the cathode side of the electrolyte membrane of the fuel cell is increased. Consequently, the differential pressure of the front and back surfaces of the electrolyte membrane is likely to exceed the membrane resistance differential pressure.

Figure 18:
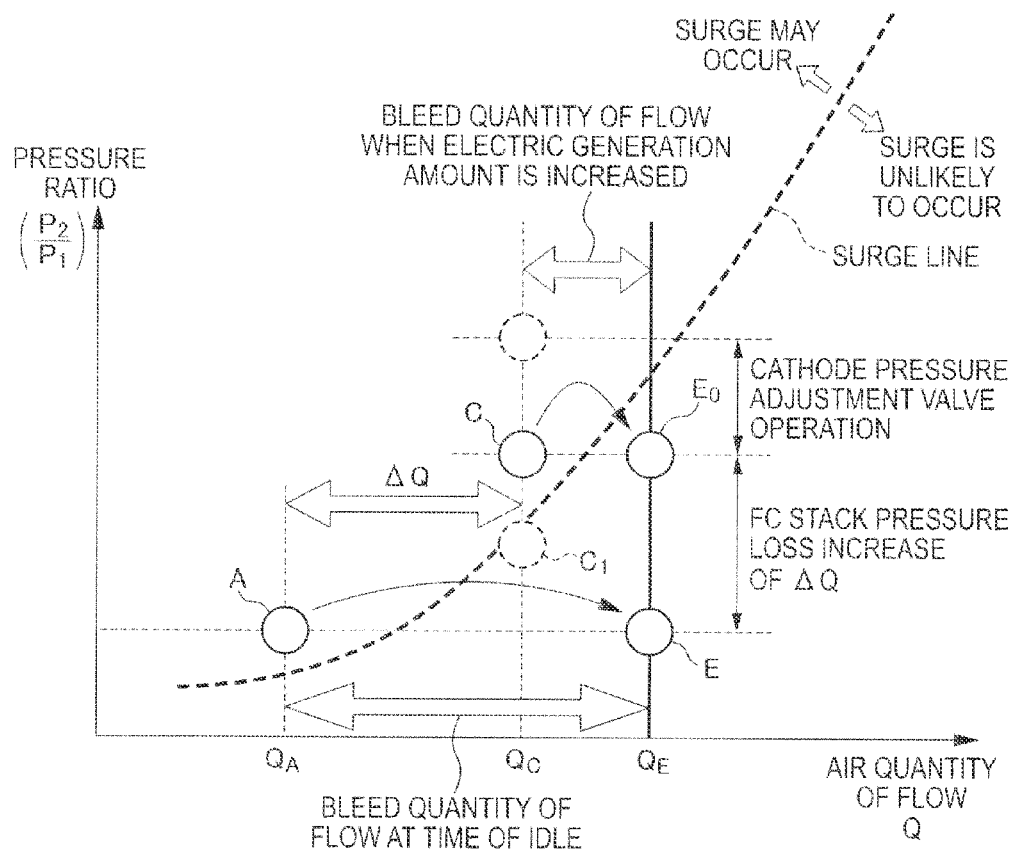
FIG. 18 is a diagram illustrating the effect of action in the third embodiment in the sound vibration mode operation.

FIG. 18 is a diagram illustrating the effect of action in a third embodiment in the sound vibration mode operation.

As described above, when the amount of electricity is increased and the quantity of flow $Q_C$ is supplied to the fuel cell stack 10, if no measure is taken, the amount of air supplied to the fuel cell stack 10 is increased by $\Delta Q$, and the exit pressure P2 of the compressor 21 is increased accordingly, with the result that there is a possibility that it is impossible to avoid a surge.

Hence, in the present embodiment, the degree of opening of the cathode pressure adjustment valve 23 is increased, and thus the exit pressure P2 of the compressor 21 is prevented from being increased, with the result that the compressor 21 is operated at operation point E0. Then, the extra amount of air ($Q_E$-$Q_C$) is bled. In this way, it is possible to prevent a surge from occurring in the compressor 21.

When the degree of opening of the cathode pressure adjustment valve 23 is excessively increased, as indicated by C1, it is likely that the exit pressure P2 of the compressor 21 is excessively lowered. In this case, the pressure on the cathode side of the electrolyte membrane of the fuel cell is low. Consequently, the differential pressure of the front and back surfaces of the electrolyte membrane is likely to exceed the membrane resistance differential pressure. In order to avoid this problem, the degree of opening of the cathode pressure adjustment valve 23 is adjusted. In this way, it is possible to protect the electrolyte membrane.

Fourth Embodiment

Figure 19:
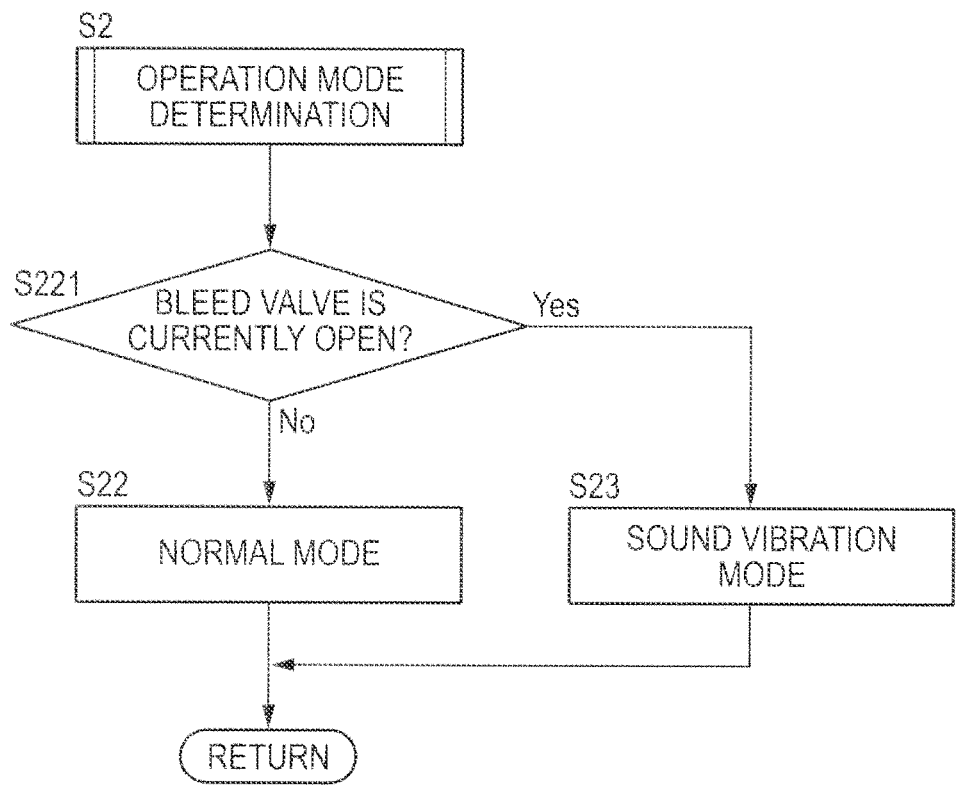
FIG. 19 is a diagram showing an operation mode determination subroutine in a fourth embodiment of the fuel cell system according to the present invention.

FIG. 19 is a diagram showing an operation mode determination subroutine in a fourth embodiment of the fuel cell system according to the present invention.

In step S221, the controller determines whether or not the bleed valve 210 is currently open. If the determination result is negative, the controller transfers the processing to step S22 whereas if the determination result is positive, the controller transfers the processing to step S23.

In step S22, the controller determines the normal mode.

In step S23, the controller determines the sound vibration mode.

When the bleed valve 210 is open, at present, the compressor 21 supplies the amount of air exceeding the amount of air necessary for the electric generation of the fuel cell stack 10, and bleeds the extra amount of air. In this case, an amount of air exceeding the sound vibration mode air amount is likely to be supplied. Thus, it is possible to supply the sound vibration mode air amount without wastefully operating the compressor 21. Even if the sound vibration mode air amount is not exceeded, since the amount of air bled is present, as compared with the case where the bleed valve 210 is closed, it is possible to supply the sound vibration mode air amount with a small amount. Hence, in the present embodiment, it is possible to prevent the compressor 21 from being wastefully operated to waste power.

Fifth Embodiment

Figure 20:
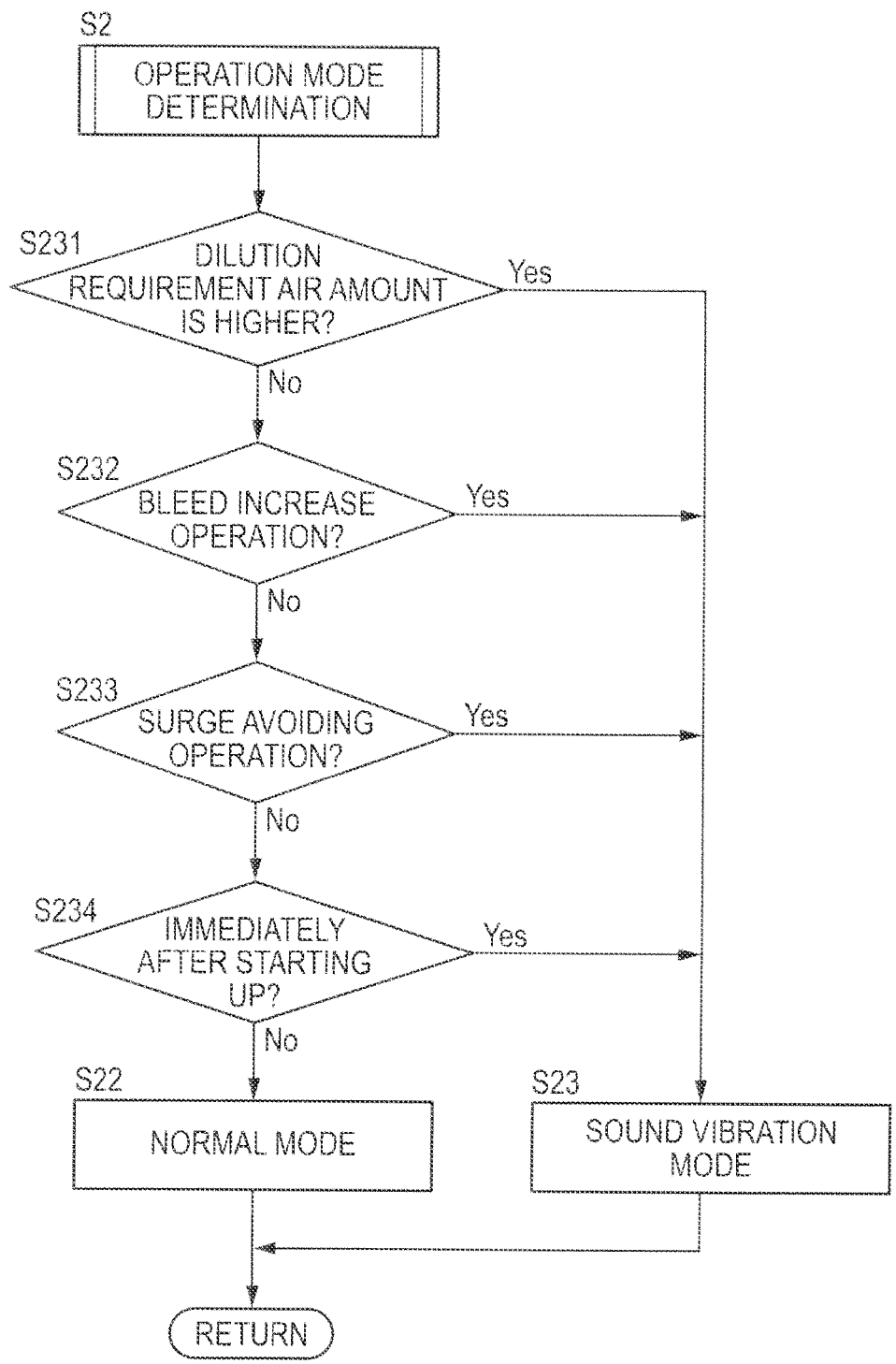
FIG. 20 is a diagram showing an operation mode determination subroutine in a fifth embodiment of the fuel cell system according to the present invention.

FIG. 20 is a diagram showing an operation mode determination subroutine in a fifth embodiment of the fuel cell system according to the present invention.

In step S231, the controller determines whether or not a dilution air amount excessing the amount of air necessary for the electric generation of the fuel cell stack 10 is needed. If the determination result is negative, the controller transfers the processing to step S232 whereas if the determination result is positive, the controller transfers the processing to step S23.

In step S232, the controller determines whether or not an operation in which the amount bled is increased for a transient operation is being performed. In the transient operation, since it is likely that the electric generation of the fuel cell stack 10 is rapidly increased, it is likely that the compressor 21 is previously rotated beyond necessity and the amount bled is increased. The controller determines whether or not the state of the operation described above is present. If the determination result is negative, the controller transfers the processing to step S233 whereas if the determination result is positive, the controller transfers the processing to step S23.

In step S233, the controller determines whether or not a surge avoiding operation is being performed. The surge avoiding operation is an operation in which in order to avoid a surge, the compressor 21 is rotated beyond necessity and the amount bled is increased. If the determination result is negative, the controller transfers the processing to step S233 whereas if the determination result is positive, the controller transfers the processing to step S23.

In step S234, the controller determines whether or not the fuel cell stack 10 has just been started up. Immediately after the fuel cell stack 10 has been started up, the anode pressure is increased and purge is continuously performed. Hence, at that time, in order to dilute purged hydrogen, the amount bled is increased. In order to increase the amount bled, the compressor 21 supplies an amount of air exceeding the amount of air necessary for the electric generation of the fuel cell stack 10. The controller determines whether or not the state of the operation described above is present. If the determination result is negative, the controller transfers the processing to step S22 whereas if the determination result is positive, the controller transfers the processing to step S23.

In step S22, the controller determines the normal mode.

In step S23, the controller determines the sound vibration mode.

In the present embodiment, in the scene where the compressor 21 currently supplies an amount of air exceeding the amount of air necessary for the electric generation of the fuel cell stack 10 and an extra amount of air is bled, the sound vibration mode operation is performed. In such a scene, it is likely that an amount of air exceeding the sound vibration mode air amount is supplied. Thus, it is possible to supply the sound vibration mode air amount without wastefully operating the compressor 21. Even if the sound vibration mode air amount is not exceeded, since the amount of air bled is present, it is possible to supply the sound vibration mode air amount by a small increase in amount. Hence, in the present embodiment, it is possible to prevent the compressor 21 from being wastefully operated to waste power.

Sixth Embodiment

Figure 21:
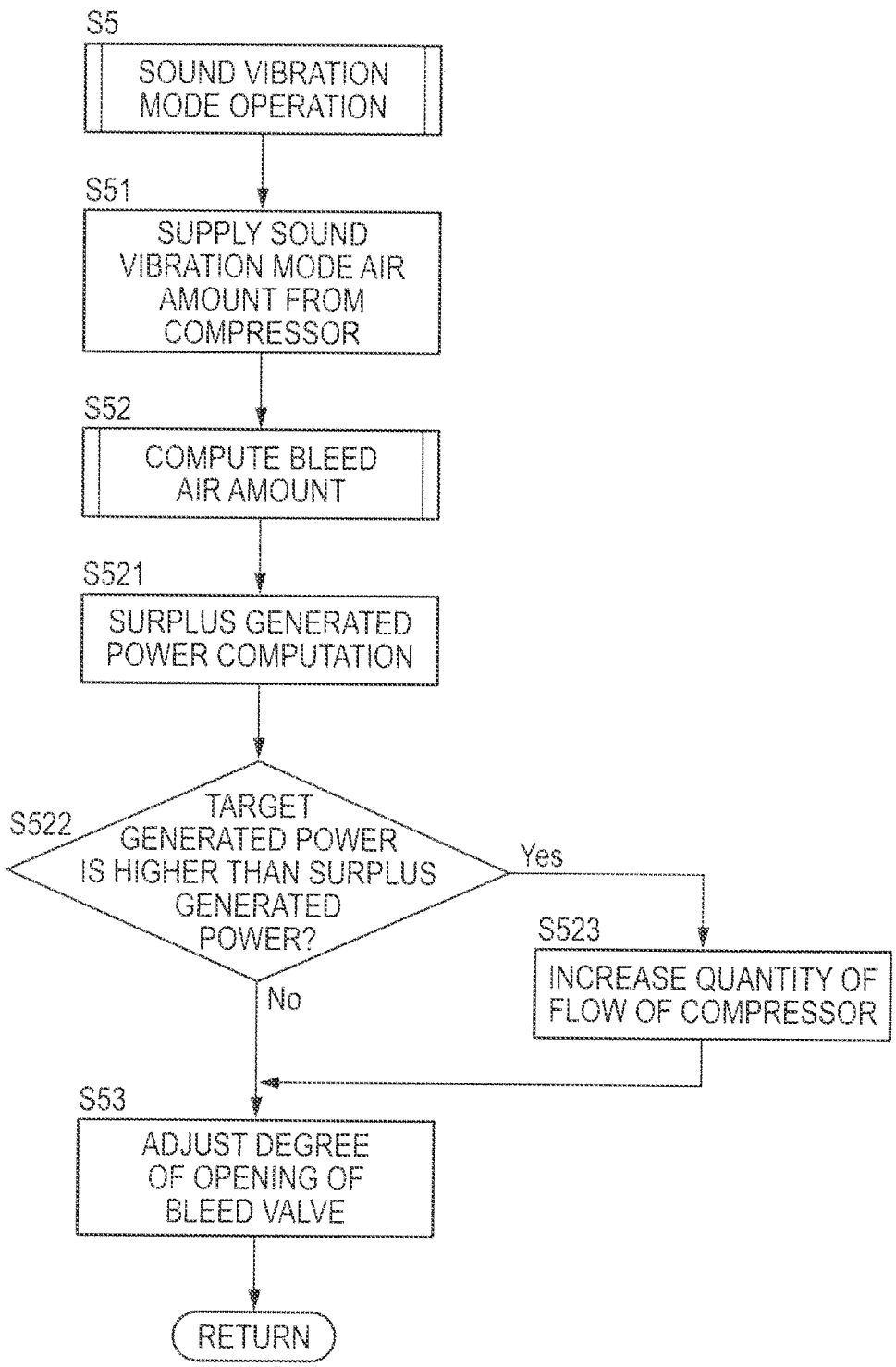
FIG. 21 is a diagram showing a sound vibration mode subroutine in a sixth embodiment of the fuel cell system according to the present invention.

FIG. 21 is a diagram showing a sound vibration mode subroutine in a sixth embodiment of the fuel cell system according to the present invention.

Since steps S51 and S52 are the same as in the first embodiment, their description will be omitted.

In step S521, the controller computes surplus generated power. The surplus generated power is power that is generated in the fuel cell stack 10 when the entire amount of air supplied from the compressor 21 is supplied to the fuel cell stack 10 without being bled. A specific computation method will be described later.

In step S522, the controller determines whether or not the surplus generated power is lower than the target generated power. The target generated power is computed, for example, as shown in FIG. 5. If the determination result is negative, the controller transfers the processing to step S53 whereas if the determination result is positive, the controller transfers the processing to step S523.

In step S523, the controller increases the quantity of flow in the compressor 21 such that the surplus generated power exceeds the target generated power. A specific computation method will be described later.

Figure 22:
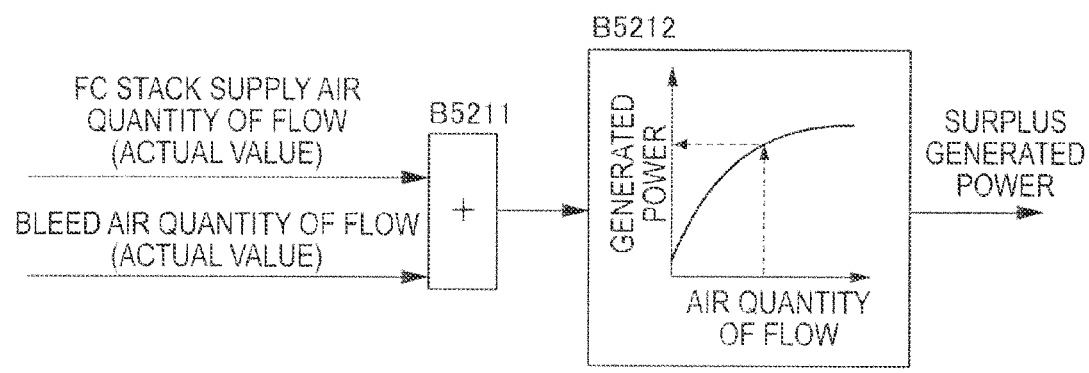
FIG. 22 is a block diagram showing a function of computing surplus generated power.

FIG. 22 is a block diagram showing the function of computing the surplus generated power.

A block B5211 adds together the amount of air actually supplied to the fuel cell stack and the amount of air bled.

A block B5212 applies the amount of air to a preset map to determine the surplus generated power.

Figure 23:
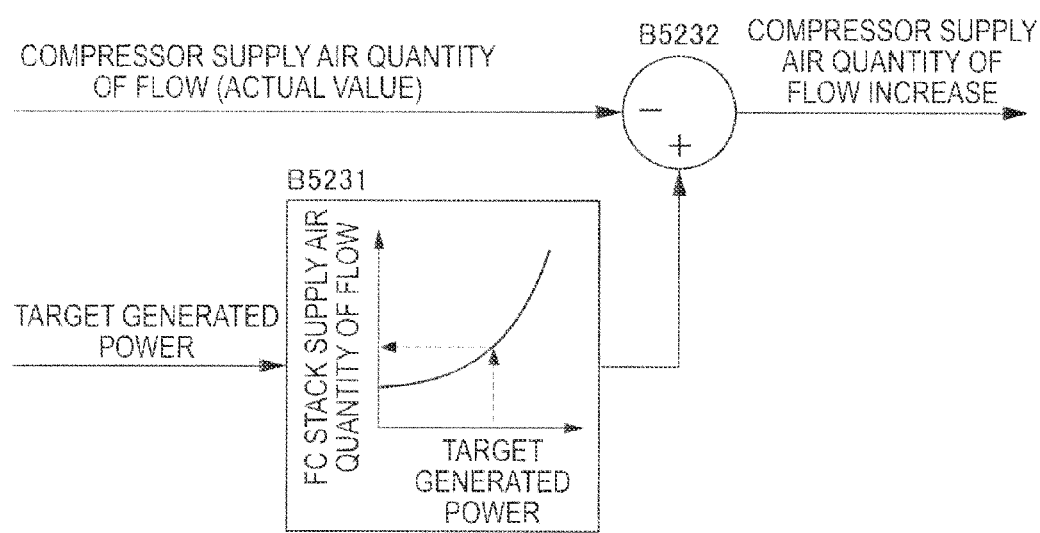
FIG. 23 is a block diagram showing a function of computing an increased amount of air supplied by the compressor.

FIG. 23 is a block diagram showing the function of computing an increased amount of air supplied by the compressor.

A block B5231 computes, based on the target generated power, the amount of air supplied to the fuel cell stack 10.

A block B5232 computes an increased amount of air by subtracting the amount of air actually supplied from the compressor 21 from the amount of air computed in the block B5231.

Figure 24:
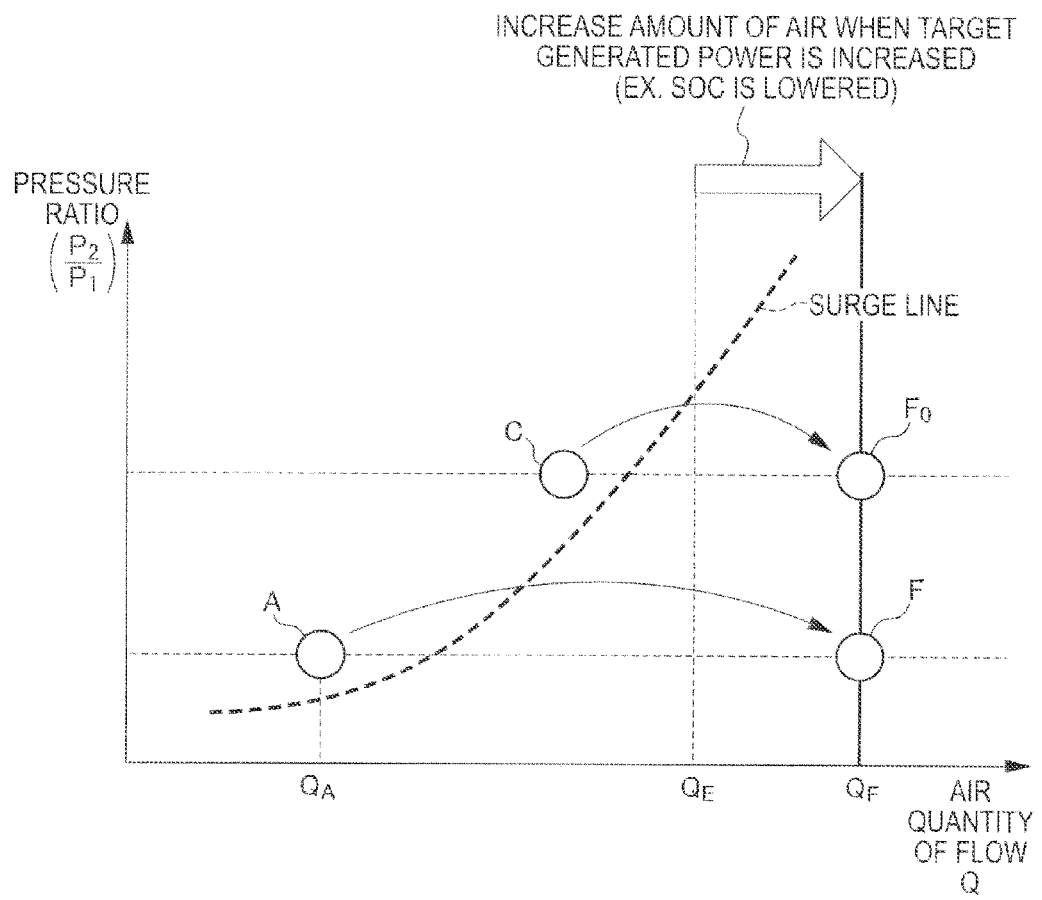
FIG. 24 is a diagram illustrating the effect of action in the sixth embodiment.

FIG. 24 is a diagram illustrating the effect of action in the sixth embodiment.

In the present embodiment, when the target generated power is increased, the amount of air supplied from the compressor is increased. In this way, for example, even if the target generated power is increased by a decrease in the battery charging rate SOC and the like, the fuel cell stack 10 can appropriately generate electricity.

Although the embodiments of the present invention have been described above, the embodiments described above simply indicate part of examples to which the present invention is applied, and it is not intended that the technical range of the present invention is limited to the specific configurations of the embodiments described above.

For example, in the sound vibration mode, a constant amount of air (sound vibration mode air amount) is supplied so that the operating sound of the compressor is not varied. However, if the constant amount of air (sound vibration mode air amount) is excessive, the passenger may feel harsh sound to have an uncomfortable feeling without the operating sound of the compressor being varied. Hence, the compressor is preferably operated in such a range that the passenger does not have such an uncomfortable feeling. Even when as in the sixth embodiment, the amount of air supplied from the compressor is increased halfway, an upper limit may be provided so that the passenger does not have an uncomfortable feeling.

The embodiments described above can be combined as necessary.

This application claims priority based on Japanese Patent Application No. 2011-219298 filed on Oct. 3, 2011 with Japan Patent office, the entire disclosure of which is incorporated herein by reference.

The invention claimed is:

1. A fuel cell system which supplies power to an external load with a storage cell and a fuel cell, the fuel cell system comprising:
   an oxidant feeder configured to supply an oxidant to the fuel cell;
   an oxidant passage which communicates with the fuel cell and along which the oxidant supplied from the oxidant feeder flows;

a bypass passage which branches from the oxidant passage upstream with respect to the fuel cell and along which part of the oxidant supplied by the oxidant feeder flows so as to bypass the fuel cell;

a bypass valve which is provided in the bypass passage and which is configured to adjust a quantity of flow of the oxidant flowing along the bypass passage;

an oxidant quantity-of-flow control unit configured to supply, with the oxidant feeder, the quantity of flow of the oxidant corresponding to an amount of electricity required of the fuel cell; and an oxidant quantity-of-flow control unit for a sound vibration mode configured to supply, with the oxidant feeder, a constant quantity of flow of the oxidant, wherein a control device for the fuel cell system includes a bypass valve control unit configured to control the bypass valve according to a requirement of the fuel cell when the oxidant quantity-of-flow control unit for the sound vibration mode controls the oxidant feeder.

2. The control device for the fuel cell system according to claim 1,
wherein the oxidant quantity-of-flow control unit for the sound vibration mode is configured to control, when a sound pressure level of an operating sound of the oxidant feeder is higher than a sound pressure level of background noise, the oxidant feeder such that the constant quantity of flow of the oxidant is supplied.

3. The control device for the fuel cell system according to claim 1,
wherein the oxidant quantity-of-flow control unit for the sound vibration mode is configured to control, when a vehicle is at rest, when the vehicle travels at a low speed, when a shift range is a parking range, when the shift range is a neutral range, when a quiet mode is set or when the fuel cell is in a low electric generation state, the oxidant feeder such that the constant quantity of flow of the oxidant is supplied.

4. The control device for the fuel cell system according to claim 1, the control device further comprising:
a pressure adjustment valve configured to adjust a pressure of the oxidant flowing along the oxidant passage;
a surge determination unit configured to determine whether or not a surge is likely to occur in the oxidant feeder; and
a pressure adjustment valve control unit configured to increase a degree of opening of the pressure adjustment valve when the surge is likely to occur.

5. The control device for the fuel cell system according to claim 1, the control device further comprising:
a pressure adjustment valve configured to adjust a pressure of the oxidant flowing along the oxidant passage;
a differential pressure determination unit configured to determine whether or not a differential pressure between the oxidant and hydrogen supplied to the fuel cell exceeds a membrane resistance differential pressure of the fuel cell; and
a pressure adjustment valve control unit configured to increase a degree of opening of the pressure adjustment valve when the differential pressure exceeds the membrane resistance differential pressure.

6. The control device for the fuel cell system according to claim 1,
wherein the oxidant quantity-of-flow control unit for the sound vibration mode is configured to control, when the bypass valve is open, the oxidant feeder such that the constant quantity of flow of the oxidant is supplied.

7. The control device for the fuel cell system according to claim 1,
wherein the oxidant quantity-of-flow control unit for the sound vibration mode is configured to control, when an amount of the oxidant for diluting waste hydrogen is higher than an amount of the oxidant required for electric generation, when an operation in which the quantity of flow of the oxidant flowing along the bypass passage is increased is being performed, when an operation is performed so as to avoid a surge or immediately after starting up, the oxidant feeder such that the constant quantity of flow of the oxidant is supplied.

8. The control device for the fuel cell system according to claim 1, the control device further comprising:
a surplus computation unit configured to compute surplus generated power when the constant quantity of flow of the oxidant is supplied from the oxidant feeder,
wherein the oxidant quantity-of-flow control unit for the sound vibration mode is configured to control, when target generated power of the fuel cell exceeds the surplus generated power, the oxidant feeder such that the amount of the oxidant supplied is increased.

9. The control device for the fuel cell system according to claim 1,
wherein the oxidant quantity-of-flow control unit for the sound vibration mode is configured to control the oxidant feeder such that a predetermined rotation speed is not exceeded.

10. The control device for the fuel cell system according to claim 1,
wherein the oxidant quantity-of-flow control unit supplies the quantity of flow of oxidant, when a sound pressure level of the oxidant feeder is higher than a predetermined value.

11. The control device for the fuel cell system according to claim 10, the control device further comprising:
a pressure adjustment valve configured to adjust a pressure of the oxidant flowing along the oxidant passage;
a surge determination unit configured to determine whether or not a surge is likely to occur in the oxidant feeder; and
a pressure adjustment valve control unit configured to increase a degree of opening of the pressure adjustment valve when the surge is likely to occur.

* * * * *